(12) United States Patent
Girardin et al.

(10) Patent No.: US 12,171,700 B2
(45) Date of Patent: Dec. 24, 2024

(54) AUTOMATIC SEAT FOR MOBILITY DEVICE SECUREMENT SYSTEM

(71) Applicant: Valeda Company, LLC, Oakland Park, FL (US)

(72) Inventors: Patrick Girardin, Ft. Lauderdale, FL (US); William Ott, Fort Lauderdale, FL (US)

(*) Notice: Subject to any disclaimer, the term of this patent is extended or adjusted under 35 U.S.C. 154(b) by 0 days.

(21) Appl. No.: 18/528,231

(22) Filed: Dec. 4, 2023

(65) Prior Publication Data

US 2024/0108521 A1 Apr. 4, 2024

Related U.S. Application Data

(63) Continuation of application No. 16/835,029, filed on Mar. 30, 2020, now Pat. No. 11,872,167.

(60) Provisional application No. 62/960,883, filed on Jan. 14, 2020, provisional application No. 62/825,325, filed on Mar. 28, 2019.

(51) Int. Cl.
*B60P 7/08* (2006.01)
*A61G 3/08* (2006.01)

(52) U.S. Cl.
CPC .......... *A61G 3/0808* (2013.01); *B60P 7/0807* (2013.01)

(58) Field of Classification Search
CPC ......... B60P 7/0807; B60P 7/0815; B60P 3/06; A61G 3/0808; A61G 3/005
USPC .......... 410/7–12, 19, 21–23, 51; 297/DIG. 4
See application file for complete search history.

(56) References Cited

U.S. PATENT DOCUMENTS

| | | | |
|---|---|---|---|
| 4,221,396 A | 9/1980 | Kehl | |
| 4,588,340 A * | 5/1986 | Howard | A61G 3/0808 410/7 |
| 4,995,775 A | 2/1991 | Gresham | |
| 5,344,265 A | 9/1994 | Ullman et al. | |
| 5,997,228 A | 12/1999 | Potter | |
| 6,537,003 B1 | 3/2003 | Rostoker | |
| 7,854,576 B2 | 12/2010 | Girardin et al. | |
| 10,702,429 B2 | 7/2020 | Hammarskjold et al. | |
| 2006/0159542 A1 | 7/2006 | Ditch | |
| 2008/0079252 A1 | 4/2008 | Shutter et al. | |
| 2010/0086375 A1 | 4/2010 | Tremblay et al. | |

(Continued)

FOREIGN PATENT DOCUMENTS

| | | |
|---|---|---|
| CN | 1765344 A | 5/2006 |
| CN | 204121291 U | 1/2015 |

(Continued)

OTHER PUBLICATIONS

Ferno Vacuum Splint (see https://fernoems.com/immobilization/vacuum-splints).

(Continued)

*Primary Examiner* — Stephen T Gordon
(74) *Attorney, Agent, or Firm* — Daniel Tallitsch

(57) ABSTRACT

The embodiments described and claimed herein include an automated securement system that lock a wheeled mobility device into a designated station aboard an autonomous public transit vehicle, thus preventing unintended movement that is discomforting and potentially dangerous for both the WMD user and other passengers. The automated securement system includes features that integrate with typical autonomous public transit vehicles to minimize obstruction during stowage while maximizing effectiveness during deployment.

2 Claims, 27 Drawing Sheets

(56) References Cited

U.S. PATENT DOCUMENTS

| | | |
|---|---|---|
| 2010/0092263 A1 | 4/2010 | Girardin et al. |
| 2011/0123286 A1* | 5/2011 | Van Roosmalen ...... A61G 3/08 410/7 |
| 2012/0091744 A1 | 4/2012 | Mcknight et al. |
| 2014/0334893 A1* | 11/2014 | Goss .................... A61G 3/0808 410/7 |
| 2020/0030166 A1 | 1/2020 | Bryant |

FOREIGN PATENT DOCUMENTS

| | | |
|---|---|---|
| CN | 205928689 U | 2/2017 |
| DE | 102019205419 A1 | 10/2020 |
| JP | H08230550 A | 9/1996 |
| JP | H09299407 A | 11/1997 |
| JP | H1094559 A | 4/1998 |
| JP | 2016140635 A | 8/2016 |
| JP | 2018187950 A | 11/2018 |

OTHER PUBLICATIONS

International Search Report, Search Strategy, and Written Opinion of the International Searching Authority for PCT/US2020/025803, Sep. 30, 2020, 15 pages, International Searching Authority for the European Patent Office.

* cited by examiner

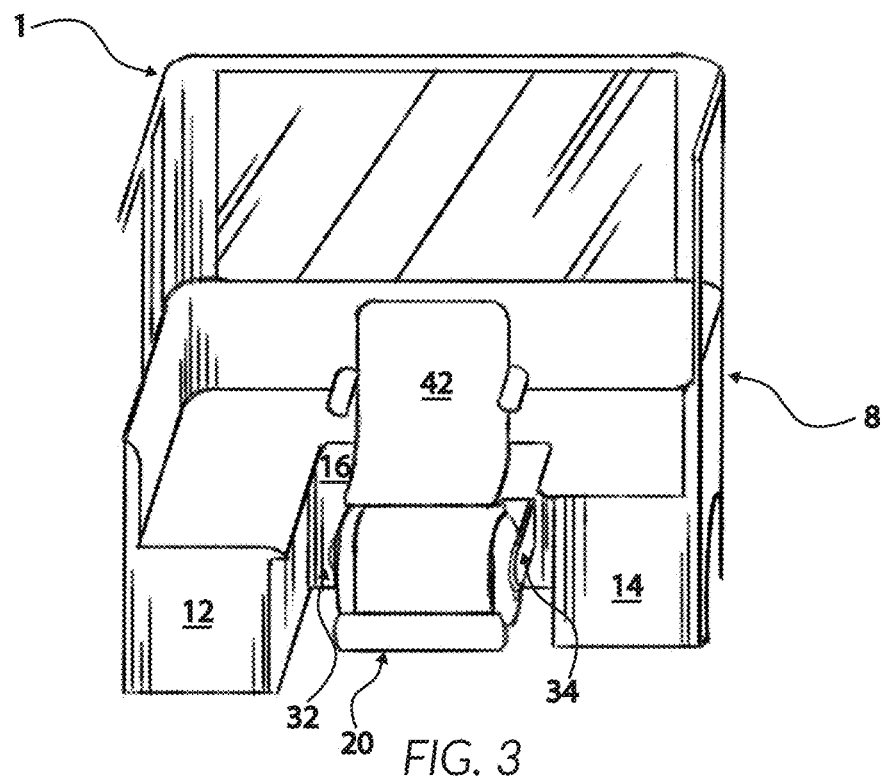
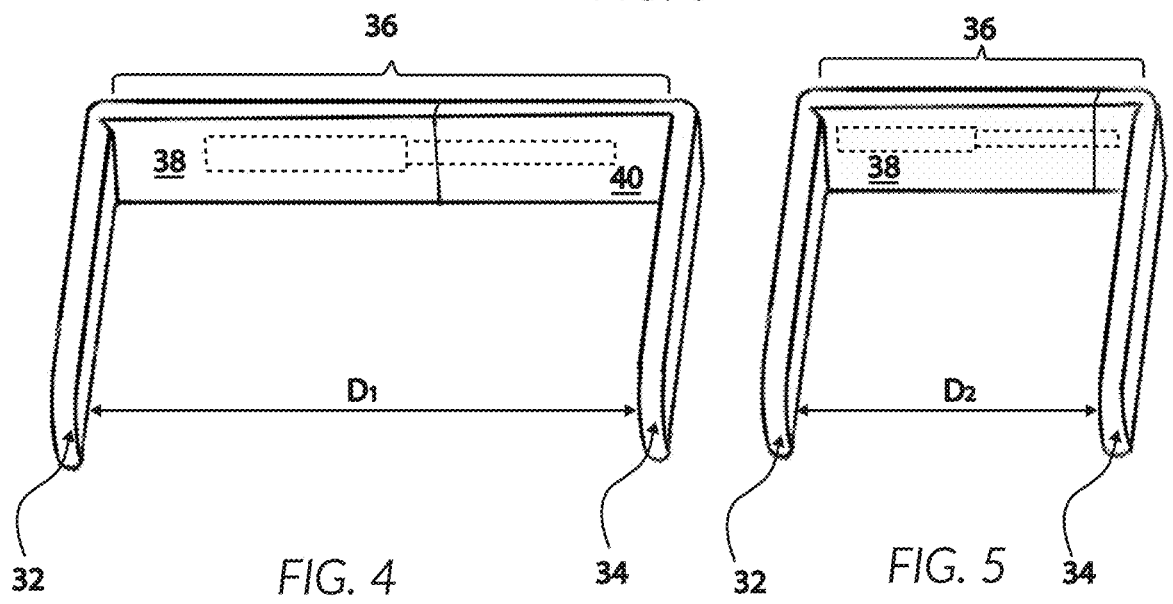

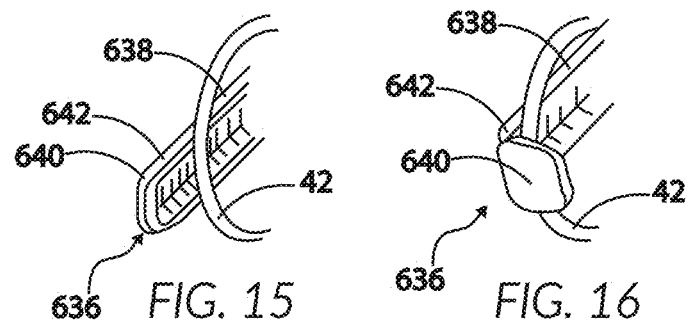
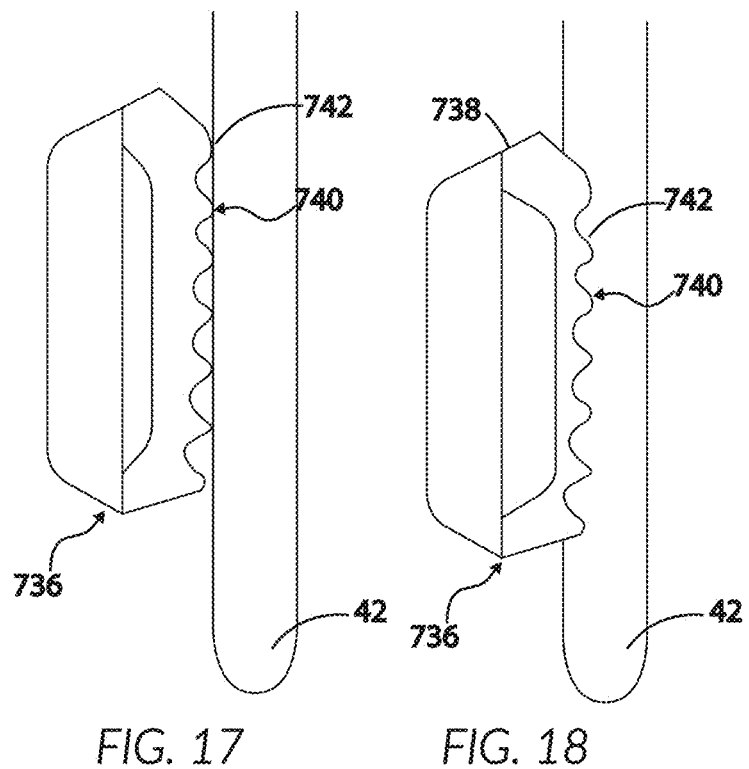

| Logic Table | | |
|---|---|---|
| WMD Secured | | |
| Condition | Input | Status required |
| Vehicle stopped | Vehicle input (Canbus, etc) | Yes |
| Vehicle neutralized (out of gear, in Park, powered down, etc) | Vehicle input (Canbus, etc) | Yes |
| Vehicle brake applied | Vehicle input (Canbus, etc) | Yes |
| WMD present on the vehicle | Floor pressure sensor | Yes (or) |
| | IR beam (described elsewhere) | Yes (or) |
| | WMD-mounted or occupant-retained RFID signal received | Yes (or) |
| | WMD-mounted QR code detected | Yes (or) |
| | Camera and image recognition software | Yes (or) |
| Autonomous WMD securement system deployed (while avoiding potential pinch hazards with ambile riders) | Floor pressure sensor | Yes (or) |
| | IR beam (described elsewhere) | Yes (or) |
| | Camera and image recognition software | Yes (or) |
| | Arm force sensors | Detect obstructions and cause the "bump-n-go" response when triggered. Signal alarm when three repetative trigger events are |
| | Squeeze force sensor that is coupled with arm position sensors | Measured rate less than than pre-determined value a WMD will tipically develop |
| WMD station occupied / WMD in position | Floor pressure sensor | Yes (or) |
| | IR beam (described elsewhere) | Yes (or) |
| | WMD-mounted or occupant-retained RFID signal received | Yes (or) |
| | WMD-mounted QR code detected | Yes (or) |
| | Camera and image recognition software | Yes (or) |
| WMD clear of obstructions | IR beams that require clear line of sight | Yes (or) |
| | Camera(s) and image recognition software | Yes (or) |
| | Squeeze force sensor that is coupled with arm position sensors | Measured rate less than than pre-determined value a WMD will tipically develop |
| WMD secured in position | Squeeze force sensor | Must maintain minimum threshold force |
| WMD re-grab in case of WMD movement, loss of squeeze force, etc. | Squeeze force sensor | Once minimum threshold force is momentarily lost, the arms rapidly traverse inward in an attempt to re secure the chair and recover the needed minimum threshold force. Note that if re-grab is not successful within a pre-set elapsed time, then the autonomous WMD securement system will generate a mandatory stop request and issue it to the autonomous vehicle. |
| WMD released | | |
| Vehicle stopped | Vehicle input (Canbus, etc) | Yes |
| Vehicle neutralized (out of gear, in Park, powered down, etc) | Vehicle input (Canbus, etc) | Yes |
| Vehicle brake applied | Vehicle input (Canbus, etc) | Yes |
| Vehicle doors opened | Vehicle input (Canbus, etc) | Yes |
| Autonomous WMD securement system retracted (while avoiding potential pinch hazards with ambile riders) | Arm force sensors | Detect obstructions and cause the "bump-n-go" response when triggered. Signal alarm when three repetative trigger events are |
| | Camera and image recognition software | Yes (or) |
| | Floor pressure sensor | Yes (or) |
| | IR beam (described elsewhere) | Yes (or) |

*FIG. 30*

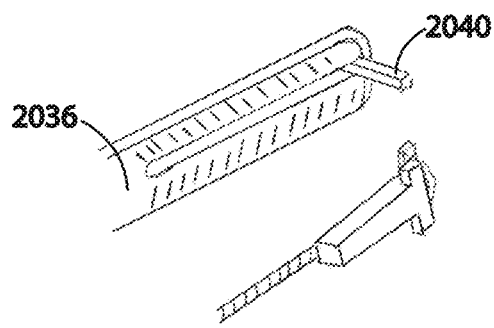
FIG. 37    FIG. 38
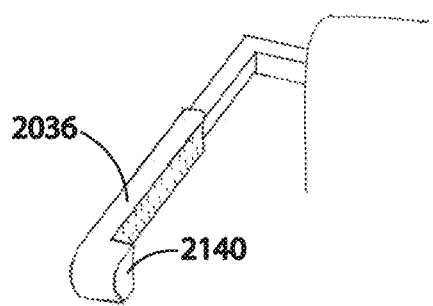
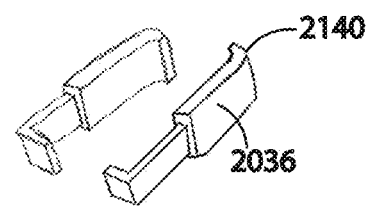
FIG. 39    FIG. 40
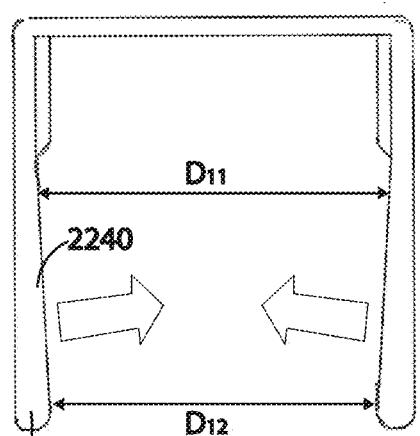
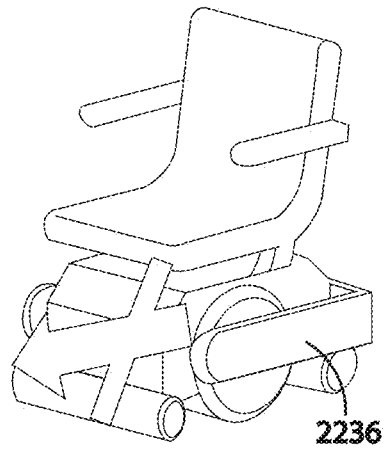
FIG. 41    FIG. 42

AUTOMATIC SEAT FOR MOBILITY DEVICE SECUREMENT SYSTEM

CROSS-REFERENCE TO OTHER APPLICATIONS

This application is a continuation of U.S. patent application Ser. No. 16/835,029, filed on Mar. 30, 2020, which claims priority to U.S. Provisional Patent Application Nos. 62/825,325, filed on Mar. 28, 2019, and 62/960,883, filed on Jan. 14, 2020, each of which is incorporated herein by reference. In addition, International Patent Application No. PCT/US20/25803 is incorporated herein by reference.

FIELD OF THE DISCLOSURE

The embodiments described and claimed herein relate generally to autonomous or semi-autonomous securement systems that are configured to secure wheeled mobility devices in vehicles, including but not limited to autonomous vehicles.

BACKGROUND

There are millions of wheeled mobility device ("WMD") users in America today. Many users remain in their WMD (e.g., wheelchairs, scooters, etc.) while boarding and riding private or mass transportation vehicles. Systems have been developed and employed to secure WMD-bound occupants. These systems are typically comprised of occupant restraints that include at least one shoulder belt along with one or more lap belts. They also include some form of WMD securement that could comprise one or more belts, bumpers, barriers, latches and/or automated grippers. Although these systems have proven successful in meeting occupant stability needs and basic crash test requirements, they are typically cumbersome and time consuming to apply. To use most of those prior art systems, another person, such as the vehicle operator, must assist with the securement of the wheelchair occupant and the wheelchair. With the advent of automated transit vehicles, where there may or may not be a vehicle operator, there is an anticipated need for securement systems that are themselves autonomous or can otherwise be applied by wheelchair occupants without assistance of another person. Complicating the design of such autonomous securement systems, it is anticipated that the space in autonomous vehicles will be in short supply, and wheelchair securement areas will need to make efficient use of space and be readily and quickly transformable into seating areas for amble passengers. The advent of low speed automated transit vehicles may also reduce or negate the need for occupant restraints because of the extremely low probability of crash events, and the low energy involved with crashes should they occur. However, there is still a need for a WMD securement system and, more particularly, for a new simplified rapid securement system that seamlessly integrates the WMD-bound rider with the transit experience provided by the newly emerging autonomous public transit vehicle.

SUMMARY OF THE EMBODIMENTS

The embodiments described and claimed herein are designed to meet these needs and solve the shortcomings of prior art solutions.

Autonomous vehicles have limited interior space and encounter a range of maneuvers and events such as turning, stopping, and potentially obstruction-avoidance. When an autonomous low-speed public transit vehicle is involved in a crash, impact forces typical of the low speed environment do not warrant the need for high energy occupant and WMD securement of the type used in other forms of public transportation. However, some level of securement is still warranted to prevent disconcerting movement of the WMD during normal maneuvers and potentially harmful movement during an accident. Some of the embodiments described and claimed herein are compatible for such a purpose, while other embodiments may also be suitable for high-speed, space-limited environments.

In one embodiment, an automated WMD securement system is provided to eliminate excessive excursion of a WMD and occupant while riding in an autonomous public transit vehicle. The system integrates with the interior structure and furnishings of the vehicle, to minimize potential obstruction for all occupants. When not in use, the automated WMD securement system is fully stowed so that the autonomous public transit vehicle can take on a full complement of amble riders. When a WMD and occupant are positioned appropriately, the automated WMD securement system, comprising multiple securement members that may be configured to secure the WMD by compression, can be deployed into use. The securement members may take the form of robust bumpers or arm structures that are equipped with powered actuating mechanisms that allow automated movement and maintenance of generally constant force at a prescribed value or range of values. The portion of the securement members designed for contact with the WMD may be equipped with soft, non-marking surfaces constructed of high-friction material formed into aggressive gripping patterns. The securement members may be actuated simultaneously, and some level of or totally independent movement may be provided to adapt to asymmetrical positioning of the WMD. The securement members may be equipped with illuminated status indicators that notify all occupants of any movement and potential tripping hazard or obstruction.

In some embodiments, the securement members may be combined with sensors and controllers to automate the securement process. The securement members and/or other components in the vehicle may be equipped with sensor points that communicate with the automated WMD securement system's intelligent controller. Those sensors may communicate information such as presence of obstructions, range from object, forces, etc. The sensors could operate via one or a combination of mechanical switching, current-sensing, visible light, IR, RF, sonar, magnetics, inertial sensing, resistance, hall-effect, induction, or capacitance, or other known sensor technologies. WMD occupant and vehicle attendant interfaces (separate or combined units) may be located at a vehicle attendant station and/or adjacent to the WMD securement position, so that the automated WMD securement system can be summoned to function on-demand. Additionally or alternatively, a microphone may be provided to receive voice instructions for processing and response by the controller. Fully autonomous function of the automated WMD securement system could also be achieved thru sensor inputs alone, for added safety and convenience.

Employment of an automated WMD securement device may follow a prescribed sequence of events. First, the occupant in a WMD moves into riding position in the designated station aboard an autonomous public transit vehicle. Second, the occupant or attendant checks the occupant's physical space to ensure that no personal items or limbs are positioned alongside the WMD where they could get pinched by the automated WMD securement system.

Once assured that the paths of the securement members are cleared, the occupant or attendant may signal for the automated WMD securement system to activate. As discussed previously, this function could also be performed autonomously by the automated WMD securement device, if desired, based for example on input from the sensor that is indicative of WMD and occupant location, size, type, etc.

In particular, the automated WMD securement device could confirm through input from a set of various sensors that the WMD is in proper position and/or that the securement members' paths are clear. When operating in full autonomous mode, the WMD securement device will be controlled by a processor that calculates a sequence of decisions based on sensor input from the various sources contained within the securement device and/or other external sources.

Whether manually or automatically, once the securement function is initiated, two or more robust securement members, which may take the form as gripping arms, may simultaneously or consecutively deploy from the stowage configuration to the securement-ready configuration, then move to a mobility device secured position. The securement members could deploy to the securement-ready configuration either before the mobility device enters the securement area, or after the mobility device has moved into final position in the securement area. Any movements performed by the automated securement system may be monitored for force requirements and potential obstructions. In the event that prescribed force limits are exceeded or an obstruction is identified, the unit will immediately reverse function and pause momentarily before reattempting the prescribed movement. It may do so for multiple attempts, for instance three, before sounding an alarm that requires interaction by the occupant or attendant to clear. During the securement phase, the securement members may make light contact with the wheels or frame of the WMD. The occupant or attendant then may make a final check to ensure there are no items trapped between the WMD and the gripping structures of the automated WMD securement device. The occupant or attendant may then signal the automated WMD securement system to secure the WMD with full specified force. These steps could be completed automatically, including when full autonomous function is utilized, so that occupant or attendant input is not required.

The securement members may be equipped with powered actuating mechanisms that allow automated movement and maintenance of a generally constant force or prescribed range of forces or variable forces depending upon driving conditions or vehicle status (park, reverse, drive, speed, acceleration along any axis, deceleration along any axis) when the automated securement system is in use. Automatic re-gripping may be performed in the event that the WMD shifts (for example, determined from a decrease in the gripping force, as detected from sensor output that reflects the current gripping force), so that specified securement force is quickly re-attained. The securement system may be interlocked with the operation of the vehicle, so that the occupant or attendant cannot signal its release until the vehicle is safely stopped or is put in park, or until the vehicle ignition is turned off. The interlock function may also include a geolocation aspect, which precludes release of the securement system until the vehicle is at a location designated for disembarking. The automated securement mechanism can be manually released in an emergency when required for occupant movement.

In one embodiment, at least one securement member has an expandable length, wherein the length of the securement member may be selectively lengthened and shortened. The securement member may have at least one securement-ready configuration and a stowage configuration. In each of the at least one securement-ready configuration, the securement member has a securement length. In the stowage configuration, the securement member has a stowage length. Each of the at least one securement length is greater than the stowage length.

In some embodiments, the securement member may include an expansion mechanism that is operable to lengthen and shorten the securement member. The expansion mechanism may comprise telescoping members, inflatable bellows, accordions, scissor mechanisms, linear actuators, cylinders and pistons, or other length changing members or mechanisms.

The securement member may include a base, an expansion zone, and a gripping zone. The expansion zone may include the expansion mechanism and may be at least partially or wholly coextensive with one or both of the base and the gripping zone. The expansion zone may be further or alternatively positioned between the base and the gripping zone. In some embodiments, the expansion zone may be entirely between the base and the gripping zone.

In the stowage configuration, the securement member may be integrated with any interior structure and/or furnishing of the vehicle, to minimize potential obstruction with all occupants and/or to provide additional space for seating of amble passengers. When not in use, the securement member may be partially, mostly, or fully stowed so that the autonomous public transit vehicle can take on a full complement of amble riders. In some embodiments, the securement member may be positioned partially or entirely underneath a seat for an amble passenger, where the end of the seat extends further into the floor area of the vehicle than does the end of the securement member. The stowage length of the securement member may also be approximately equal to or less than the depth of the seat. The amble passenger seat may flip upwards or otherwise stow when the securement member is in use to secure a mobility device. In such a configuration, the underside of the amble passenger seat may serve as a back rest or back stop for the mobility device when disposed in a securement position in a mobility securement area.

The securement member may be moveable laterally (transverse to the length of the securement member) to engage a surface of the mobility device and secure the mobility device by compression and/or tension. In some embodiments, multiple, moveable securement members can be deployed into use and may be configured to secure the WMD by compression. For example, the securement members may be configured to engage opposite faces of the mobility device or structures on the mobility device (e.g., left and right sides of the mobility device, or the outer and inner faces of a single wheel) and to squeeze. In other embodiments, multiple, moveable securement members can be deployed into use and may be configured to secure the WMD by tension. For example, the securement members may be configured to engage the opposite inner faces of opposite wheels and to push outward (away from each other). In yet other embodiments, more than two securement members can be deployed into use and may be configured to secure the WMD by one or both of compression and tension.

The securement members may take the form of robust bumpers or arm structures that are equipped with powered actuating mechanisms that allow automated movement and maintenance of a generally constant force at a prescribed value or range of permissible values. In other embodiments, the securement members may apply variable force on the mobility device to counteract the acceleration and deceleration of the vehicle and prevent or reduce movement of the mobility device that may otherwise occur. The portion of the securement members designed for contact with the WMD (the gripping zone) may be equipped with soft, non-marking surfaces constructed of high-friction material formed into aggressive gripping patterns. The securement members may be actuated simultaneously, and some level of independent movement may be provided to adapt to asymmetrical positioning of the WMD. The securement members may be equipped with or associated with illuminated status indicators and/or speakers that notify all occupants of any movement and potential tripping hazard or obstruction.

The gripping function can be provided by or further augmented with one or plural additional features. For instance, additional gripping members can be stowed in the floor beneath the docking station, or in a shallow housing that may sit proud of the floor within the center of the docking station. These gripping members could be configured to raise and spread out to make contact against the inside of the wheels of the WMD that are being secured by the outer gripping members. The inside grippers may have details that promote positive securement against the wheels, such as high friction surfaces and aggressive lug patterns that engage with WMD wheel surfaces and details. The inside grippers also provide substantial stabilizing and reaction force that enable higher grip forces with no risk of causing damage to the WMD. In the event of a crash, extremely high squeeze loads can be applied to withstand in excess of 20 g's that are required in many governing standards. The extremely high squeeze loads can be applied thru stored spring forces, pneumatics, pyrotechnics, compressed gas container, or other motive forces.

Alternatively, grip securement can be augmented with an added articulation on each outer gripping member. As the gripping member secures the WMD by pressing against the wheels, the extra articulation allows the end of the gripping member to rotate inward to entrap the wheels and mechanically prevent the WMD from dislodging during severe maneuvering or in a crash event.

Another approach to achieving increased securement can utilize internal bladders within the outside (or inside) gripping members. The bladders can remain deflated when stowed or during typical squeeze functions, while being rapidly inflated when a crash event or aggressive maneuvering are sensed. The bladders expand and force the grips to firmly engage with WMD wheel surfaces and details, thus improving the securement significantly. The bladders can be filled with compressed air, pyrotechnic gases, or stored fluids.

The gripping members can contain partially filled bladders to improve the capture security of the system. The bladders can be filled with magnetorheological fluid that will flow easily while the arms are pressed against the WMD. Once the gripping surfaces are displaced the magnetorheological fluid can be energized to create rigid topography that interlocks with details on the WMD surfaces. Alternatively, the bladders can be filled with non-Newtonian fluid that will flow easily and conform to the shape of the WMD when the arms are pressed against the WMD, and then automatically create a rigid topography that interlocks with details on the WMD surfaces when subjected to an abrupt force, for example during a vehicle accident. As yet another alternative, the bladders could contain filler material or small particles, such as balls made of Styrofoam (or similar soft material) or rubber or a more rigid material, that may move relatively freely within the bladder and conform to the shape of the WMD when the arms are pressed against the WMD. A vacuum may then be applied to the bladder using, for example, a vacuum pump, which may prevent the filler material or small particles from moving freely within the bladder whereby the bladder presents a rigid topography that interlocks with details on the WM D surfaces.

The WMD station on the vehicle can be monitored via cameras or other sensors that are linked to intelligent feature-recognition software. The WMD securement device can autonomously process the situation and react with the appropriate function that provides the best rider experience and trip safety. Such functions could include recognizing the presence and location of a WMD and occupant, recognizing the type of WM D, identifying ideal points of contact for securement (typically drive wheels), and avoiding sensitive surfaces and items such as fenders, accessory bags and occupants' limbs. If the WMD type or ideal point of contact is recognized (using RFID signal, QR code, proximity sensors, lidar, pressure sensors on the floor, light beams, image recognition, or other identification methods), this information can be used as an input in the securement process, and the system will secure the WMD with securement settings that are specific for the WMD type or ideal point of contact. These settings can have different parameters as force, position, monitoring and adjustment strategy (in case the chair needs to be re-secured during the ride). For example, during the securement member deploy phase, the securement length can be set to a specific length that is preset and appropriate for a variety of WMD types, the securement length can be determined or preset as appropriate for a specific WMD type, or the securement length can be set so that the gripping zone is located approximately on or adjacent the ideal point of contact when the securement member is moved to mobility device secured position. A database or look-up table can be established to identify the various makes and models of WMD, based on encoded information within the RFID or QR code or bar code, or by recognizing key distinguishing features by camera. Once WMD type is identified, a set of squeeze-force criteria and/or securement length criteria can be developed to optimize securement for each application. A reliable default squeeze-force value and/or securement length value can be used in the event that no specific make or model is identified and/or referenced in the database. The database can be built and maintained at a central location where parameters for each WMD securement device can be downloaded with the latest version during scheduled maintenance.

Other embodiments, which include some combination of the features discussed above and below, and other features which are known in the art, are contemplated as falling within the claims even if such embodiments are not specifically identified and discussed herein.

BRIEF DESCRIPTION OF DRAWINGS

FIG. 3 is a cross-sectional, perspective view of the autonomous vehicle that incorporates the first embodiment of the wheeled mobility device securement system, from a viewpoint inside of the vehicle;

FIG. 4 is a first perspective view of the gripping members of the first embodiment of the wheeled mobility device securement system, showing the gripping members in a first or stored position;

FIG. 5 is a second perspective view of the gripping members of the first embodiment of the wheeled mobility device securement system, showing the gripping members in a second or extended position;

FIG. 15 is a first perspective view of a gripping member of a sixth embodiment of the wheeled mobility device securement system, showing the gripping member in an intermediate position between stored and fully extended;

FIG. 16 is a second perspective view of the gripping member of the sixth embodiment of the wheeled mobility device securement system, showing the gripping member in a fully extended position;

FIG. 17 is a first perspective view of a gripping member of a seventh embodiment of the wheeled mobility device securement system, showing the gripping member in an intermediate position between stored and fully extended;

FIG. 18 is a second perspective view of the gripping member of the seventh embodiment of the wheeled mobility device securement system, showing the gripping member in a fully extended position;

FIG. 30 is a logic table that may be used during an automated securement and release sequence;

FIG. 37 is a first perspective view of an alternative gripping member to the one shown in FIGS. 15-16;

FIG. 38 is a second perspective view of the alternative gripping member shown in FIG. 37;

FIG. 39 is a first perspective view of another alternative gripping member to the one shown in FIGS. 15-16;

FIG. 40 is a perspective view of another alternative gripping member to the one shown in FIGS. 15-16;

FIG. 41 is a plan view of a securement system that incorporates sloping engagement surfaces;

FIG. 42 is a perspective view of the securement system of FIG. 41;

Figure 1:
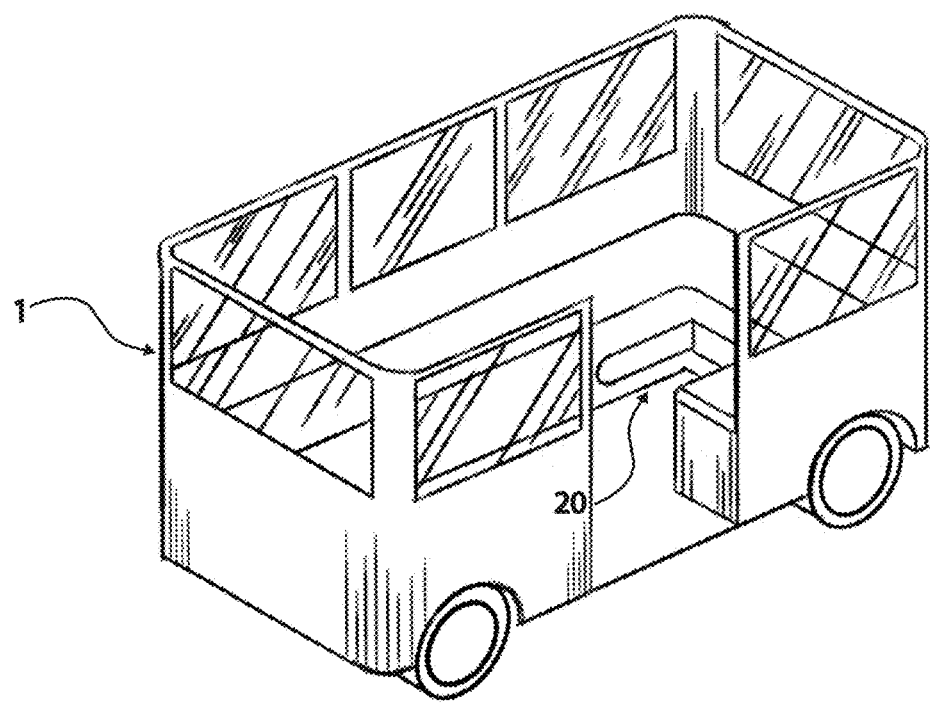
FIG. 1 is a first perspective view of an autonomous vehicle that incorporates a first embodiment of a wheeled mobility device securement system.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE EMBODIMENTS

FIGS. 1-5 show a first embodiment of a wheeled mobility device securement system 20 for securing a wheeled mobility device 42 in an autonomous vehicle 1. The autonomous vehicle 1, as shown, includes a door opening 2 along a first side of the vehicle 1, a centrally located walkway or aisle 4, and amble passenger seating 6 positioned along the perimeter of the vehicle 1. The seating 6 and aisle 4 collectively define two generally U-shaped seat regions 8, 10 located at opposite ends of the vehicle. As configured, the vehicle 1 may include one or two mobility device securement systems located in one or both of the U-shaped seat regions 8, 10. As depicted, a single wheeled mobility device securement system 20 is provided in the autonomous vehicle 1 at seat region 8, although a second, similarly-configured system could be provided at seat region 10.

The wheeled mobility device securement system 20 is positioned in a wheeled mobility device securement area 22 that occupies a portion, or one end, of the centrally-located aisle 4. The securement area 22 has a perimeter comprising a front side 24, a rear side 26, a right side 28, and a left side 30 (defined according to the intended direction of the wheeled mobility device 42 when secured, as shown in FIG. 3). One or more of the rear side 26, right side 28, and left side 30 of the securement area 22 abut the amble passenger seating 6, which may be said to comprise modules 12, 14, 16 that may include seat surfaces at a top surface. For the avoidance of doubt, the modules 12, 14, 16 at the right side 28, left side 30, and rear side 26, respectively, may be integrated as a single unit or provided as separate units. Moreover, although shown with seats, the modules 12, 14, 16 may or may not have seating at a top surface.

The wheeled mobility device securement system 20 includes securement or gripping members, which in the first embodiment may take form as arms 32, 34 that are supported by a centrally located telescoping mechanism 36. The telescoping mechanism 36 may comprise two telescoping members 38, 40 that conceal, for example, a linear actuator that has one end fixed to arm 32 and the other end fixed to arm 34. The telescoping mechanism 36 may be closely adjacent, abutting, flush, or recessed within the module 16. The telescoping mechanism may include overlapping or telescoping panels that are approximately flush with the front-facing surface of the module 16. As shown best in FIG. 2, the telescoping mechanism 36 can be said to be integrated with the module 16 and/or located approximately or directly below the amble passenger seating 6, whereby the telescoping mechanism 36 does not present a tripping hazard or obstruction in the aisle 4.

Figure 2:
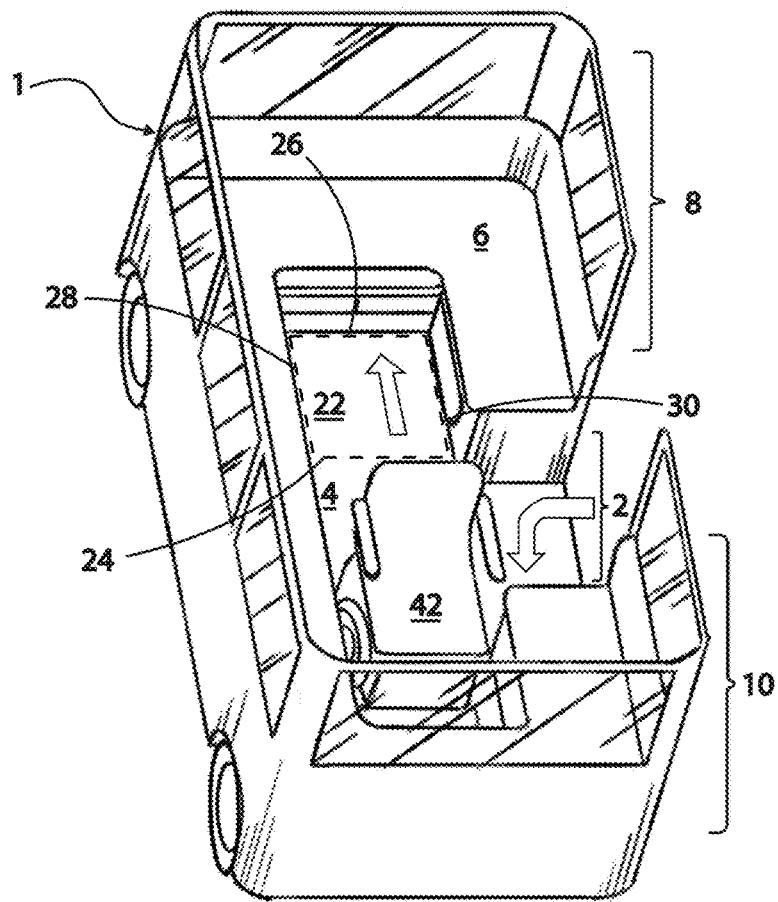
FIG. 2 is a second perspective view of the autonomous vehicle that incorporates the first embodiment of the wheeled mobility device securement system, with the roof peeled away.

The telescoping member 36 is configured to move the arms 32, 34 from a first or stored position (FIGS. 1, 2, and 4) to a second or extended position (FIGS. 3 and 5). In the first position, the arms 32, 34 are closely adjacent to, abutting, flush with, or recessed within the modules 12, 14. The modules 12, 14 may include pockets or recessed areas that conform to the shape of the arms 32, 34, whereby the arms 32, 34 are approximately flush with the laterally-facing surfaces of the modules 12, 14 when placed in the first position. As best shown in FIG. 2, in the first position, the arms 32, 34 can said to be located approximately or directly below the amble passenger seating 6, whereby the arms 32, 34 do not present a tripping hazard or obstruction in the aisle 4. In the second position, the arms 32, 34 are spaced from the modules 12, 14 for engagement with the wheeled mobility device. In the first position, the arms 32, 34 are spaced apart a distance D1. In the second position, the arms 32, 24 are spaced apart a distance D2. The distance D1 is greater than D2, whereby the wheeled mobility device 42 is secured in the vehicle 1 at least by compression.

Although depicted in the first embodiment as arms 32, 34 separated by a telescoping mechanism 36, the gripping members may take many forms and may be provided with motive force using many different mechanisms. In all embodiments, the gripping members and associated mechanisms, in their first or stored positions, are fully or at least mostly contained within the modules 12, 14, 16 or the floor or other structures of the vehicle, and outside of the aisle 4, whereby the gripping members and associated mechanisms do not present a tripping hazard or obstruction in the aisle 4. Alternatively, the gripping members and associated mechanisms, in their first positions, are fully or at least mostly positioned approximately or directly below the amble passenger seating 6, and outside of the aisle 4, whereby the gripping members and associated mechanism do not present a tripping hazard or obstruction in the aisle 4.

Further embodiments of a telescoping mechanism 1736, 1836, 1936 are depicted in FIGS. 31-36. In particular, in FIGS. 31-32, the wheeled mobility device securement system 1720 is provided as a drop-in type system, where both the telescoping mechanism 1736 and gripping members 1732, 1734 fit within pocket(s), or undercut or recessed area(s) 1740 in the seating modules 1712, 1714, 1716 (formed as separate modules or a unitary module). In that respect, the system 1720, when placed in a stored configuration, is disposed mostly or entirely outside of the flooring area and underneath the seating surfaces of the modules 1712, 1714, 1716, and will not present a tripping hazard or obstruction in the aisle 4.

In FIGS. 33-36, the wheeled mobility device securement systems 1820, 1920 include telescoping mechanisms 1836, 1936 disposed mostly or entirely below or flush with the floor of the vehicle. In system 1820, the telescoping mechanism 1836 is disposed at the rearward end of the gripping members 1832, 1834, whereby the telescoping mechanism 1836 will also be disposed under the rear seating module 1816. In system 1920, the telescoping mechanism 1936 may be disposed anywhere along the length of the gripping members 1932, 1934, including at the center as shown. The floor of the vehicle will need to include a channel 1850 which allow the gripping members 1832, 1834 to move toward each other. In both systems 1820, 1920, the modules 1812, 1814, 1912, 1914, and possibly module 1816, 1916, will include pocket(s), or undercut or recessed area(s) 1840, 1940, for receiving the gripping members 1832, 1834, 1932, 1934 when placed in their stored positions.

Figure 6:
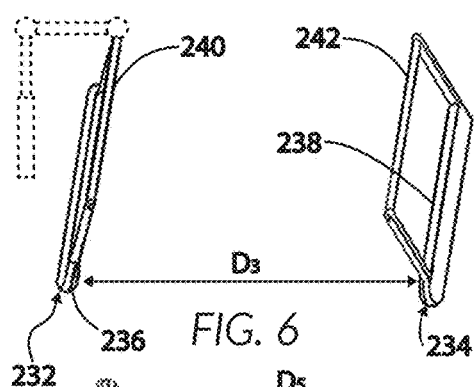
FIG. 6 is a first perspective view of gripping members of a second embodiment of the wheeled mobility device securement system, showing the gripping members in a first or stored position.
Figure 7:
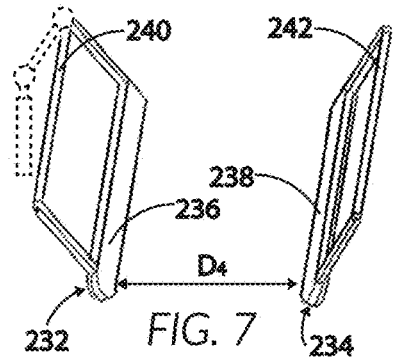
FIG. 7 is a second perspective view of the gripping members of the second embodiment of the wheeled mobility device securement system, showing the gripping members in a second or extended position.

In other embodiments, the gripping members can rotate between the first and second positions. More particularly, in a second embodiment shown in FIGS. 6-7, the gripping members take the form of wings 232, 234 with mobility device engagement portions 236, 238 at their lower ends and pivot axes 240, 242 at their upper ends. The pivot axes 240, 242 are aligned generally horizontally and in a longitudinal direction, generally parallel with right side 28 and left side 30 of the securement area 22. The wings 232, 234 may be connected to the modules 12, 14, respectively, at the pivot axes 240, 242. Alternatively, one or both of the wings 232, 234 may be connected to the module 16 at one end of the pivot axes 240, 242. The gripping members include one or more rotating mechanisms that may be disposed closely adjacent, abutting, flush, or recessed within the modules 12, 14, 16. The rotating mechanisms may include one or more rotary or linear actuators that are coupled to the pivot axes 240, 242 for moving the wings 232, 234 between a first or stored position and a second or extended position. In the case of separate linear actuators, each engaging member 236, 238 can be operated independently, for example, in a way that can better accommodate off-center placement of the wheeled mobility device in the securement area. In the first position (FIG. 6), the wings 232, 234 are positioned generally vertically, or angled slightly away from each other, whereby the wings 232, 234 are closely adjacent, abutting, flush, or recessed within the modules 12, 14. In the second position (FIG. 7), the wings 232, 234 are angled toward each other, whereby the engagement portions 236, 238 are spaced from the modules 12, 14 for engagement with the wheeled mobility device 42. In the first position, the engagement portions 236, 238 are spaced apart a distance D3. In the second position, the engagement portions 236, 238 are spaced apart a distance D4. The distance D3 is greater than D4, whereby the wheeled mobility device 42 is secured in the vehicle 1 at least by compression.

Figure 8:
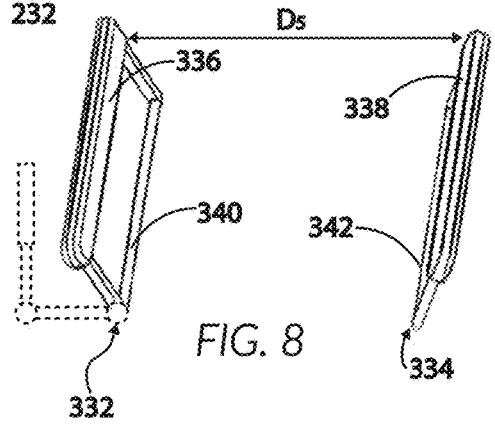
FIG. 8 is a first perspective view of gripping members of a third embodiment of the wheeled mobility device securement system, showing the gripping members in a first or stored position.
Figure 9:
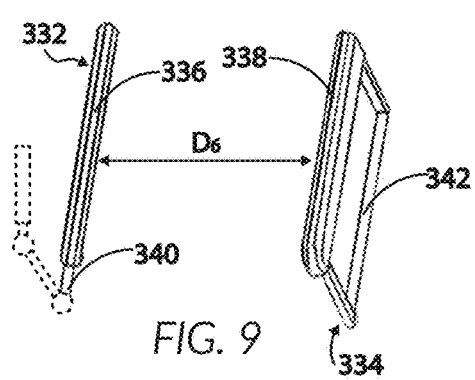
FIG. 9 is a second perspective view of the gripping members of the third embodiment of the wheeled mobility device securement system, showing the gripping members in a second or extended position.

In a third embodiment shown in FIGS. 8-9, the gripping members take the form of wings 332, 334 with mobility device engagement portions 336, 338 at their upper ends and pivot axes 340, 342 at their lower ends. The pivot axes 340, 342 are aligned generally horizontally and in a longitudinal direction, generally parallel with right side 28 and left side 30 of the securement area 22. The wings 332, 334 may be connected to the modules 12, 14, respectively, at the pivot axes 340, 342. Alternatively, one or both of the wings 332, 334 may be connected to the module 16 at one end of the pivot axes 340, 342. The gripping members include one or more rotating mechanisms that may be disposed closely adjacent, abutting, flush, or recessed within the modules 12, 14, 16, and/or within the floor of the vehicle. The rotating mechanisms may include one or more rotary or linear actuators that are coupled to the pivot axes 340, 342 for moving the wings 332, 334 between a first or stored position and a second or extended position. In the case of separate linear actuators, each engaging member 436, 438 can be operated independently, for example, in a way that can better accommodate off-center placement of the wheeled mobility device in the securement area. In the first position (FIG. 8), the wings 332, 334 are positioned generally vertically, or angled slightly away from each other, whereby the wings 332, 334 are closely adjacent, abutting, flush, or recessed within the modules 12, 14. In the second position (FIG. 9), the wings 332, 334 are angled toward each other, whereby the engagement portions 336, 338 are spaced from the modules 12, 14 for engagement with the wheeled mobility device 42. In the first position, the engagement portions 336, 338 are spaced apart a distance D5. In the second position, the engagement portions 336, 338 are spaced apart a distance D6. The distance D5 is greater than D6, whereby the wheeled mobility device 42 is secured in the vehicle 1 at least by compression.

Figure 10:
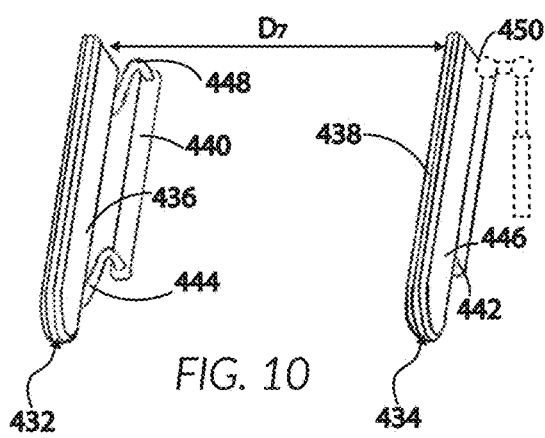
FIG. 10 is a first perspective view of gripping members of a fourth embodiment of the wheeled mobility device securement system, showing the gripping members in a first or stored position.
Figure 11:
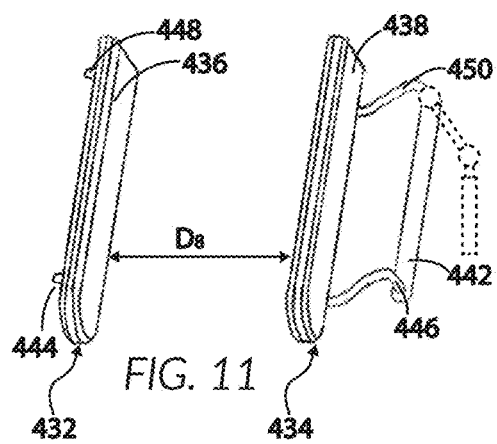
FIG. 11 is a second perspective view of the gripping members of the fourth embodiment of the wheeled mobility device securement system, showing the gripping members in a second or extended position.

In a fourth embodiment shown in FIGS. 10-11, the gripping members take the form of four-bar linkages 432, 434. The four-bar linkages 432, 434 include mobility device engagement portions 436, 438 connected to base members 440, 442 via pivot members 444, 446, 448, 450, whereby the pivot members 444, 446, 448, 450 provide an offset pivot for the engagement portions 436, 438. Pivot members 444, 446 interconnect the engagement members 436, 438 to base member 440, 442 at a first end of the four bar-linkages 432,434, and pivot members 448, 450 interconnect the engagement members 436, 438 to base member 440, 442 at a second end of the four-bar linkages 432, 434. The pivot members 444, 446, 448, 450 rotate about pivot axes that are aligned generally vertically. The base members 440, 442 may be connected to the modules 12, 14, respectively, or may be connected to the floor of the vehicle 1. The gripping members include one or more rotating mechanisms that may be disposed closely adjacent, abutting, flush, or recessed within the modules 12, 14, 16, or located within the floor of the vehicle. The rotating mechanisms may include one or more rotary or linear actuators that are coupled to one or more of the pivot axes of the pivot members 444, 446, 448, 450 for moving the four-bar linkages 432, 434 between a first or stored position and a second or extended position. In the case of separate actuators, each engaging member 436, 438 can be operated independently, for example, in a way that can better accommodate off-center placement of the wheeled mobility device in the securement area. In the first position (FIG. 10), the four-bar linkages 432, 434 are positioned closely adjacent, abutting, flush, or recessed within the modules 12, 14, whereby the engaging members 436, 438 are positioned generally above the base members 440, 442. In the second position (FIG. 11), the engaging members 436, 438 are spaced from the modules 12, 14 for engagement with the wheeled mobility device 42, whereby the engaging members 436, 438 are laterally spaced from the base members 440, 442. In the first position, the engagement portions 436, 438 are spaced apart a distance D7. In the second position, the engagement portions 436, 438 are spaced apart a distance D8. The distance D7 is greater than D8, whereby the wheeled mobility device 42 is secured in the vehicle 1 at least by compression.

Figure 12:
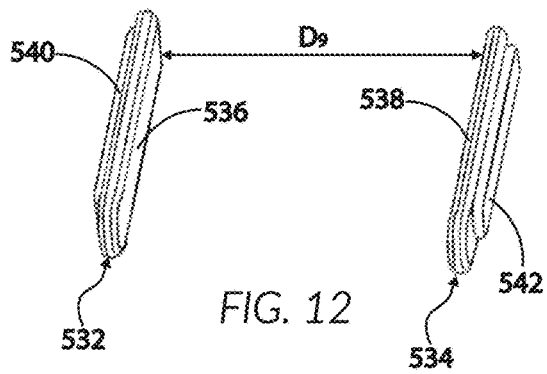
FIG. 12 is a first perspective view of gripping members of a fifth embodiment of the wheeled mobility device securement system, showing the gripping members in a first or stored position.
Figure 13:
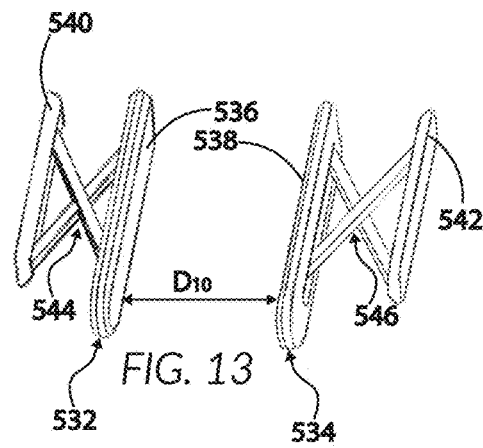
FIG. 13 is a second perspective view of the gripping members of the fifth embodiment of the wheeled mobility device securement system, showing the gripping members in a second or extended position.
Figure 14:
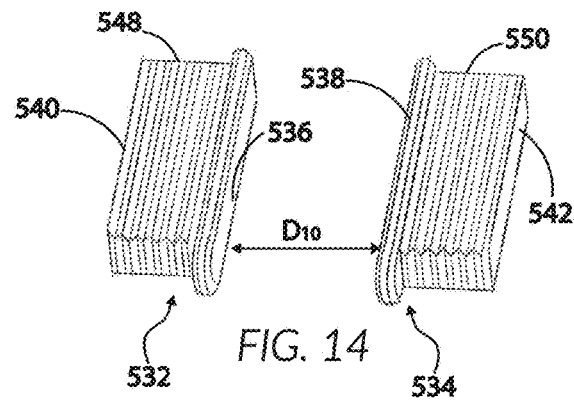
FIG. 14 is a third perspective view of the gripping members of the fifth embodiment of the wheeled mobility device securement system, showing the gripping members in a second or extended position and including protective bellows.

While the first through fourth embodiments use either telescoping mechanisms or pivoting mechanisms to move the gripping members between the first and second positions, additional embodiments may use expansion mechanisms. For instance, in a fifth embodiment shown in FIGS. 12-14, the gripping members take the form as scissor members 532, 534. The scissor members 532, 534 include mobility device engagement portions 536, 538 connected to base members 540, 542 via scissor mechanisms 544, 546. The base members 540, 542 may be connected to the modules 12, 14, respectively, or may be connected to the floor of the vehicle 1, the base members 540, 542 are disposed closely adjacent, abutting, flush, or recessed within the modules 12, 14. The scissor mechanisms 544, 546 may include, for example, a common or separate linear actuators that move the scissor members 532, 534 between a first or stored position and a second or extended position. In the case of separate linear actuators, each engaging member 536, 538 can be operated independently, for example, in a way that can better accommodate off-center placement of the wheeled mobility device in the securement area. In the first position (FIG. 12), the scissor members 532, 534 are positioned closely adjacent, abutting, flush, or recessed within the modules 12, 14, whereby the engaging members 536, 538 are collapsed and adjacent to or embedded in the base members 540, 542. In the second position (FIG. 13), the engaging members 536, 538 are spaced from the modules 12, 14 for engagement with the wheeled mobility device 42, whereby the engaging members 536, 538 are laterally spaced from the base members 540, 542. In the first position, the engagement portions 536, 538 are spaced apart a distance D9. In the second position, the engagement portions 536, 538 are spaced apart a distance D10. The distance D9 is greater than D10, whereby the wheeled mobility device 42 is secured in the vehicle 1 at least by compression. As they can in the other embodiments, the engagement portions 536, 538 may be configured to move forward and backward in a longitudinal direction, or pivot about a vertical or horizontal axis, or change profile along its length to conform to the profile of the WMD. As shown in FIG. 14, the scissors mechanisms 544, 546 may also be provided with protective bellows 548, 550 for the protection of the wheeled mobility device 42 user and amble passengers in the vehicle 1. As an alternative to the scissors mechanisms 544, 546 of the fifth embodiment, the bellows 548, 550 shown in FIG. 14 may take the form of inflatable bellows for moving the engagement members 536, 538 between the first and second positions.

Figure 62:
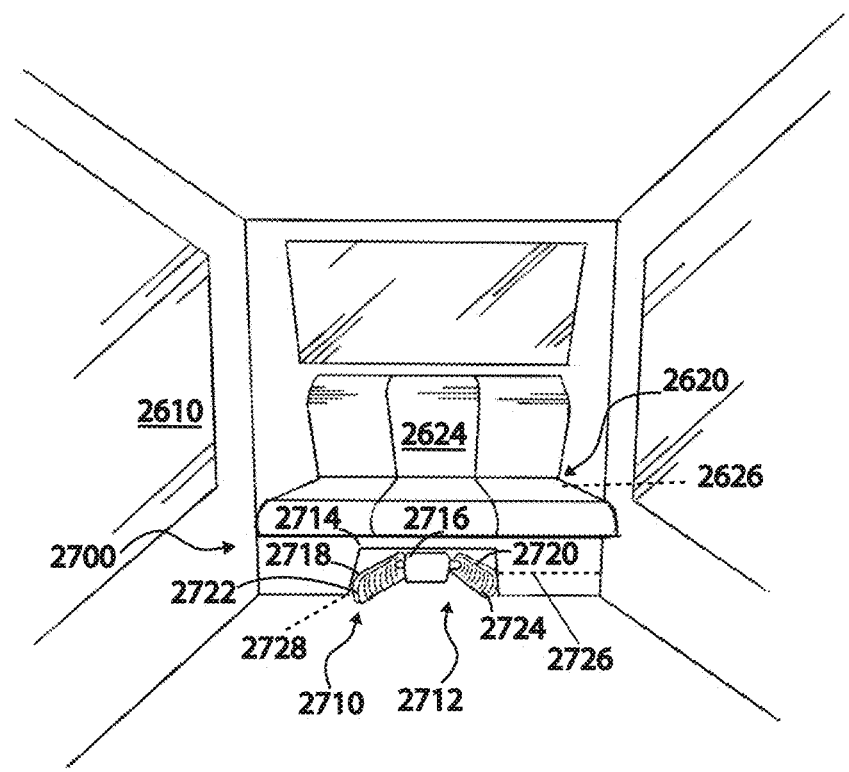
FIG. 62 is a first perspective view of yet another embodiment of a mobility device securement system positioned within an amble passenger seating area, with the securement member in a stowage configuration and the amble passenger seat in a use position.
Figure 63:
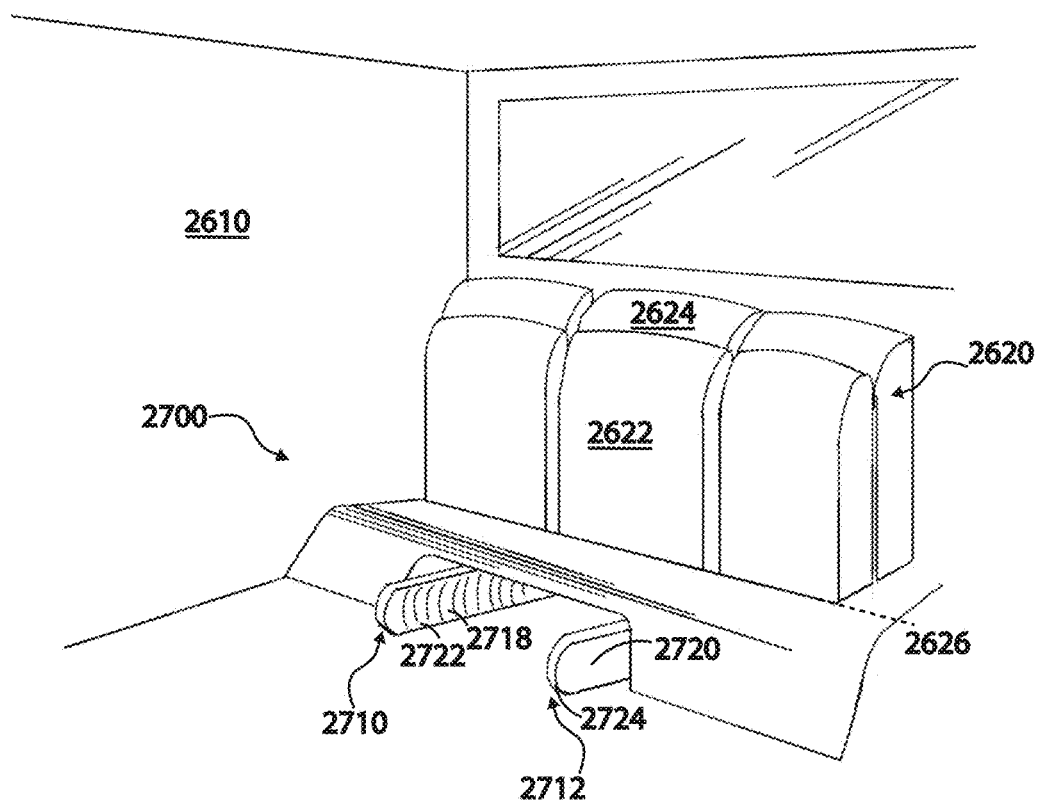
FIG. 63 is a second perspective view of the embodiment of FIG. 62, with the securement member in a stowage configuration and the amble passenger seat in a non-use position.
Figure 64:
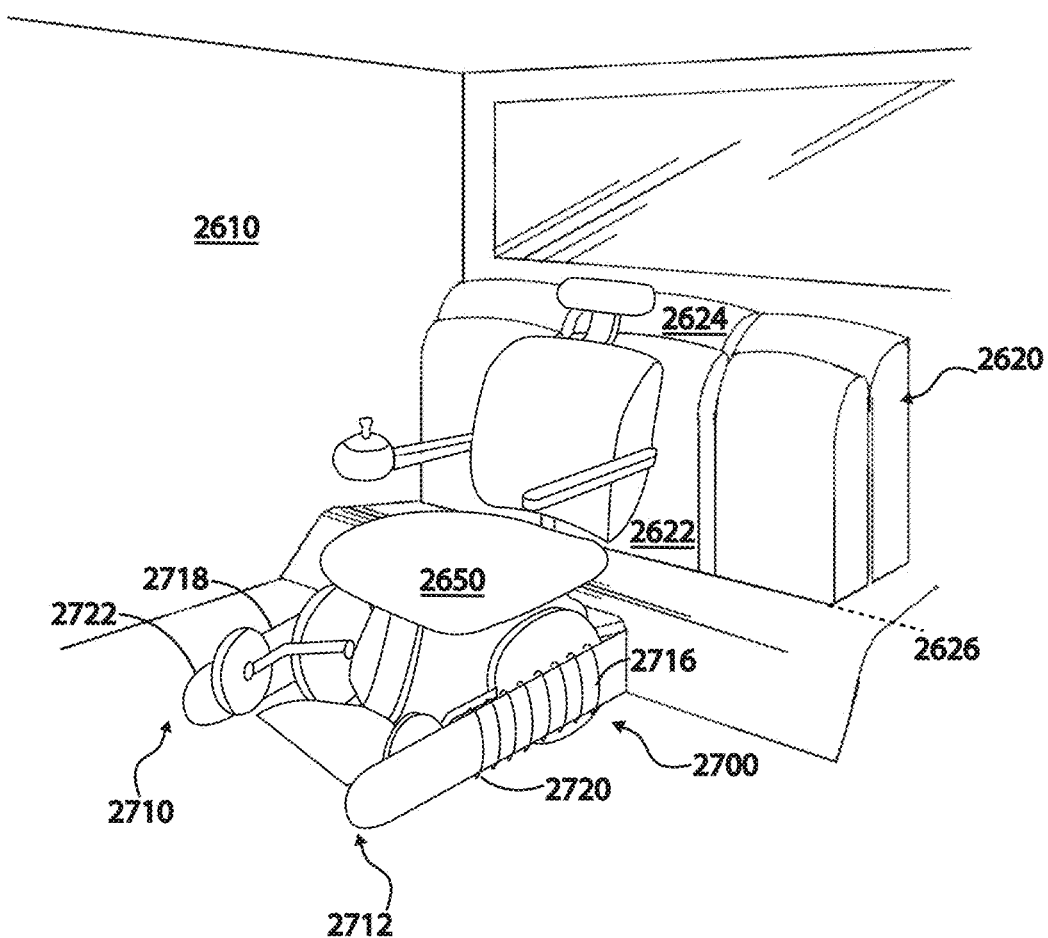
FIG. 64 is third perspective view of the embodiment of FIG. 62 securing a wheeled mobility device, with the securement member in a mobility device secured position and the amble passenger seat in a non-use position; and, FIG. 65 is a schematic view of pneumatically or hydraulically moveable and lockable pins.

In yet another embodiment, FIGS. 62-64 show a first embodiment of a mobility device securement system 2700 for securing a wheeled mobility device 2650 in a vehicle 2610. The mobility device securement system 2700 may be integrated into an amble passenger seating area 2620 positioned anywhere in the vehicle 2610, including along a perimeter of the vehicle 2610 as shown. The seating area 2620 may include one or more seats 2622 and/or seatbacks 2624. The seats 2622 may move between a use position as shown in FIG. 62, for amble passenger seating, to a non-use position as shown in FIG. 63. In the non-use position, the seat 2622 is positioned out of the way to clear additional area for mobility device securement. The seats 2622 may pivot about a horizontal axis 2626 to an up position, as shown, or a down position. A pivot about a horizontal axis 2626 is not essential; any other axis, pivots or slides or other movement mechanisms may be use to effectuate movement of the seat 2622 to an out of the way, non-use position. The underside of the seats 2622 may provide a backrest for the mobility device when secured by the securement system 2700.

The mobility device securement system 2700 includes at least one, and preferably two, securement members 2710, 2712 for securing the mobility device 2650. The securement members 2710, 2712 are configured to move from a stowage configuration, shown in FIGS. 62-63, to a securement-ready configuration, to mobility device secured position as shown in FIG. 64. In the securement-ready configuration, the length of the securement members 2710, 2712 has expanded (compare length in FIG. 62 with length in FIG. 64), whereby the securement members 2710, 2712 are no longer stored under the seat 2622 and have extended into a mobility device securement zone of the floor area for engagement with/securement of the mobility device 2650. In the mobility device secured position, the securement members 2710, 2712 may have moved laterally along axis 2726, closer together in instances where the mobility device 2650 is secured by compression as shown in FIG. 64, or farther apart in instances where the mobility device 2650 is secured by tension.

The securement members 2710, 2712 may include a base 2714, 2716, an expansion zone 2718, 2720, and a gripping zone 2722, 2724. The securement members 2710, 2712 may be supported (i.e., secured to the vehicle) at the base 2714, 2716. In this embodiment, the securement system 2700 includes a central housing 2702 that includes movement mechanisms (internal, not shown) that exert force on the base 2714, 2716 for moving the securement members 2710, 2712 toward and away from each other (e.g., laterally) along an axis 2726. The movement mechanisms may comprise telescoping members, inflatable bellows, accordions, scissor mechanisms, linear actuators, cylinders and pistons, or other length changing members or mechanisms.

The expansion zone 2718, 2720 may include an expansion mechanism (internal, not shown) and may be at least partially or wholly coextensive with one or both of the base 2714, 2716 and the gripping zone 2722, 2724. The expansion zone 2718, 2720 may be further or alternatively positioned between the base 2714, 2716 and the gripping zone 2722, 2724. In some embodiments, the expansion zone 2718, 2720 may be entirely between the base 2714, 2716 and the gripping zone 2722, 2724, as shown. The expansion mechanism is operable to lengthen and shorten the securement members 2718, 2720 along axis 2728. Axis 2728 may be transverse to axis 2726. The expansion mechanism may comprise telescoping members, inflatable bellows, accordions, scissor mechanisms, linear actuators, cylinders and pistons, or other length changing members or mechanisms.

The gripping zone 2722, 2724 of the securement members 2710, 2712 are designed for contact with the mobility device 2650 and may be equipped with soft, non-marking surfaces constructed of high-friction material formed into aggressive gripping patterns. As shown in FIG. 63, the gripping zones 2722, 2724 are engaged with a wheel of the mobility device 2650, although in some embodiments or for some types of mobility devices, it may be preferable for the gripping zones 2722, 2724 to engage a different or larger wheel, or some other structure on the wheeled mobility device.

In some embodiments, the length of the securement members 2710, 2712 in the securement-ready configuration (referred to herein as the securement length), may be pre-determined for compatibility with a large subset of mobility devices that are in wide usage. In other embodiments, the securement length may be custom set by the user (vehicle operator, mobility device owner) as appropriate. In yet other embodiments, the securement system 2700 may include various processors, controllers, and sensors to determine an ideal point of contact on the mobility device for the gripping zones 2722, 2724. In one such embodiment, one or more proximity or optical sensors could be used, alone or in combination with artificial intelligence, to provide one or more signals indicative of various structures on the mobility device, while a controller can identify the ideal point of contact from those signals. The optical sensor could be disposed in one or both of the gripping zones 2722, 2724 of the securement members 2710, 2712. In another such embodiment, pressure sensitive flooring sheets or arrays of pressure sensitive strips or pads may be used to provide a signal indicative of the location of one or more wheels of a mobility device, while a controller can set the securement length based on that signal so that the gripping zones 2722, 2724 are positioned generally adjacent one of those wheels. The controller may be programmed to set the securement length so that the gripping zones 2722, 2724 are positioned generally adjacent the larger of the wheels. In even yet other embodiments, the securement system 2700 may include various processors, controllers, and sensors to determine the general mobility device type or model, and set one or more of various parameters that are considered ideal for that device type or model, such as the securement length, forces, etc. In one such embodiment, a sensor could be provided for reading an RFID tag on the mobility device, wherein the RFID tag identifies the mobility device type or model, or one or more of the preferred parameters for the mobility device (e.g., securement length, forces, or other parameters).

Any of the foregoing embodiments of the mobility device securement system may be augmented with features that enhance the gripping function of the gripping members. For instance, as shown in FIGS. 15-16, the gripping members may each take the form of an engagement member 636 with a primary gripping portion 638 that is pivotally connected to secondary gripping portion 640 at pivot point 642. The primary gripping portion 638 engages with the side of the wheeled mobility device 42 when the engagement member 636 is moved to the second position (FIG. 15). Subsequently, the secondary gripping portion 640 may rotate about pivot point 642 from a retracted or stored position (FIG. 15) to an articulated or engaged position (FIG. 16) to engage with a forward facing surface or structure of the wheeled mobility device 42, for example, the front surface of a wheel of the wheeled mobility device 42. In this position, the secondary gripping portion 640 makes firm contact with and improve the capture security of the wheeled mobility device 42. Any number of actuators or similar structures may be used to move the secondary gripping portion 640 between stored and articulated positions, such as rotary or linear actuators. It is contemplated that the secondary gripping portion 640 may be used during regular operation, or may rapidly move into position during an accident through spring forces, pneumatics, pyrotechnics, compressed gas container or other motive forces.

Other embodiments having both a primary and secondary gripping portion are shown in FIGS. 37-40. In FIGS. 37-38, the end of the gripping member 2036 includes a retractable peg 2040 that flips out and, after the gripping member 2036 has been moved into contact with the side of the wheeled mobility device, powers back to catch a portion of the wheeled mobility device, such as the front surface of the wheel as shown in FIG. 38. Any number of actuators or other mechanisms may be used to move the peg 2040 between the various positions. In FIGS. 39-40, the gripping member 2136 may be extendable along its length and include a fixed peg 2140 at its end. Prior to engaging the wheeled mobility device, the gripping member 2136 will be placed in an extended condition (long). After the gripping member 2136 is placed into engagement with a side of the wheeled mobility device, the gripping member will move to an retracted position (short) whereby the pegs will catch a forward facing structure on the wheeled mobility device, such as a the front of a wheel as shown in FIG. 40. Any number of mechanisms, such as telescoping mechanisms with linear actuators, can be used to lengthen and shorten the gripping member 2136.

A similar effect as having primary and secondary gripping portions can be achieved through gripping members 2236 with engagement surfaces 2240 that are angled inward, as shown in FIGS. 41-42. For instance, a first portion of the engagement surfaces 2240 can be farther apart than a second portion of the engagement surfaces 2240 (i.e., distance D11>distance D12), where the first portion is disposed rearward of the second portion. With such a configuration, the trapping force on the side of the wheeled mobility device will increase in the event that the wheeled mobility device moves forward.

In another embodiment, the gripping members may be provided with pressure bladders to improve the capture security of the device. For instance, as shown in FIGS. 17-18, each gripping member may take the form of a wheeled mobility device engagement member 736 that includes an internal pressure bladder 738 that has a deflated condition (FIG. 17) and an inflated condition (FIG. 18). The engagement member 736 may have contoured engaging face 740, such as ribs, lugs, and knobs 742, to enhance gripping. The pressure bladder, when inflated, enhances the engagement between the contours on the engaging face and various details on the wheeled mobility device, such as the wheel spokes. The bladder system may use an incompressible fluid, which provides faster inflation and better securement than a compressible fluid. It is contemplated that the pressure bladder 738 may be used during regular operation, or may rapidly inflate during an accident through pneumatics, pyrotechnics, compressed gas container or other motive forces. In alternative embodiments, the face 740 of the engagement member 736 may be flat when the bladder 738 is deflated, whereby the bladder 738 forms the contoured features 742 when inflated.

Figures 19, 20:
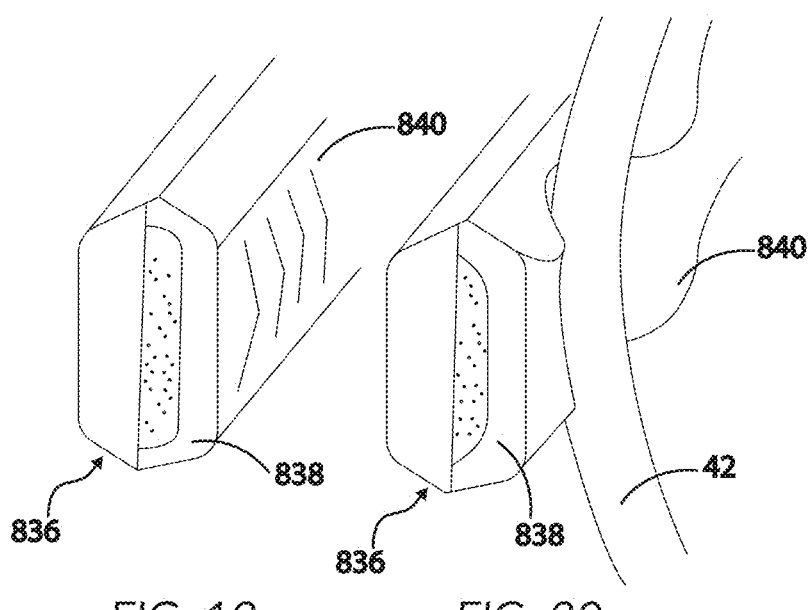
FIG. 19 is a first perspective view of a gripping member of an eighth embodiment of the wheeled mobility device securement system, showing the gripping member in a stored position.
FIG. 20 is a second perspective view of the gripping member of the eighth embodiment of the wheeled mobility device securement system, showing the gripping member in an extended position.

In yet another embodiment, the gripping members may be provided with "phase changing" bladders to improve the capture security of the wheeled mobility device. For instance, as shown in FIGS. 19-20, the gripping members 836 can each have a bladder 838 at the engagement face 840. The bladder 838 may initially be soft and/or conformable and/or change shape while the arms are pressed against the side of wheeled mobility device, as shown in FIG. 20. Once the engagement face 840 is displaced around the various contours on the side of the wheeled mobility device, the "phase" of the bladder may be changed to harden and/or make non-conformable and/or fix the shape, whereby a rigid topography is formed to interlock the bladder 838 with details on the wheeled mobility device 42 surface.

The "phase changing" bladder may comprise a "smart fluid" that has a first condition, where the fluid allowed to move or flow freely and the bladder can change shape to match the shape or side contour of the wheeled mobility device surface. The "smart fluid" may also have a second condition, where the fluid is prevented from moving freely and behaves like a more viscous fluid or viscoelastic solid, and in some cases like a solid. In the second condition, the fluid-filled bladder can be said to be "locked" into engagement with peaks and valleys of a side contour of the wheeled mobility device surfaces. The fluid may change from the first condition to the second condition via a trigger. As one example, the bladder 838 may be filled with a magnetorheological fluid that will flow easily while the arms are pressed against the side of the wheeled mobility device 42, as shown in FIG. 20. Once the engagement face 840 is displaced around the various contours on the side of the wheeled mobility device 42, the magnetorheological fluid can be triggered, specifically energized, to create a rigid topography that interlocks with details on the wheeled mobility device 42 surfaces. It is contemplated that the magnetorheological fluid can be energized during regular operation, or may be rapidly energized after detection of an accident. As is well known, magnetorheological fluids include micrometer-sized magnetic (e.g., iron) particles in a carrier fluid (e.g., mineral oil, synthetic, oil, water, or glycol) with a substance that prevents the iron particles from settling. The magnetic particles align into fibrous structures upon the application of a magnetic field to the fluid, usually perpendicular on the direction of the magnetic flux. This restricts the movement of the fluid (e.g., increases viscosity), proportional to the power and intensity of the magnetic field.

Other "phase changing" or "smart" materials or fluids could be used in place of the magnetorheological fluid, such as: electrorheological fluids whose resistance to flow can be altered by an applied electric field; non-Newtonian fluids that have shear thickening properties that arise from the application of a sharp force; a sealed bag/bladder filled with small balls or generally spherical beads (or other structures, beads or particles of any compatible shape, size and material, including but not limited to polystyrene balls, or Styrofoam) that can be evacuated of air using a vacuum which will cause the particles to collectively form a generally rigid structure that generally matches or corresponds the side profile of the WM D.

It is contemplated that similar smart material-filled bladders could be used in back and/or head rests for wheeled mobility devices, whereby the back and head rest can conform around the back of the wheeled mobility device base and/or seat frame and/or the back of the occupant's head.

In yet other embodiments, the gripping members may include various contours, knobs, paddles, fingers, and other grippers or extremities that improve the capture security of the wheeled mobility device. For instance, as disclosed in U.S. Patent Application Publication No. 2010-0086375, which is incorporated by reference, the gripper arms can contain multiple spring-loaded fingers that interlock with details on the wheeled mobility device to improve securement. The spring could be provided in the form of leaf springs, coil springs, or other memory devices pushing on a matrix of engaging pins that are guided by, for example, a rigid block drilled with holds. For example, as shown in FIGS. 43-46, a gripper member 2336 could include a guide block 2350, a plurality of pins 2352, and a spring plate or mattress 2354. The guide block 2350 is provided with holes 2356 that receive the pins 2352. The spring plate 2354 includes a plurality of spring fingers 2358. One end of each pin 2352 extends outwardly from an engaging face 2340 of the gripper member 2336, while the other end of the pin 2352 is disposed against a corresponding spring finger 2358 on the spring plate 2354. The pins 2352 could be covered by a molded flexible surface membrane composed of rubberized fabric or other suitable material to protect the wheeled mobility device. The block 2350 could be formed of plastic or other suitable material. The pins 2352 could be formed of steel, plastic, or other suitable material. The spring plate 2354 could be formed of steel or other suitable material. The pins 2352 need not be spring biased, and instead could each be moveable between a retracted position and an extended position via a solenoid or linear actuator or other movement mechanism. In that regard, the pins 2352 would be selectively locked in either a retracted position or an extended position depending upon the status of the solenoid or other movement mechanism.

In some embodiments, the gripper member 2336 may be provided with one or more "locks" for the plurality of pins 2352 to hold one, some, most, or all of the pins 2352 in position after they become interlocked with details on the contacted surface of the wheeled mobility device. In that regard, the gripper member 2336 with pins 2352 will behave in a similar manner as the smart material-filled bladders described above. More specifically, the gripper member 2336 may have a first condition in which the pins 2352 are spring-loaded outward and will move inward when the gripper member 2336 and wheeled mobility device are urged into contact. By virtue of the displaceable pins 2352, the gripper member is conformable and/or will change shape to generally match the shape of the various contours on the side of the wheeled mobility device. When the one or more locks are engaged, one or more of the pins will be fixed in place. In that respect, the engagement face of the gripper member 2336 will "harden" or become non-conformable or become a fixed shape, whereby a rigid topography is formed to interlock the gripper member 2336 with details on the wheeled mobility device surface. The gripper member 2336 can be said to be "locked" into engagement with peaks and valleys of a side contour of the wheeled mobility device surfaces. The lock is not limited to the spring-biased pins and can be incorporated into the solenoid or other movement mechanism embodiments described above.

Figure 60:
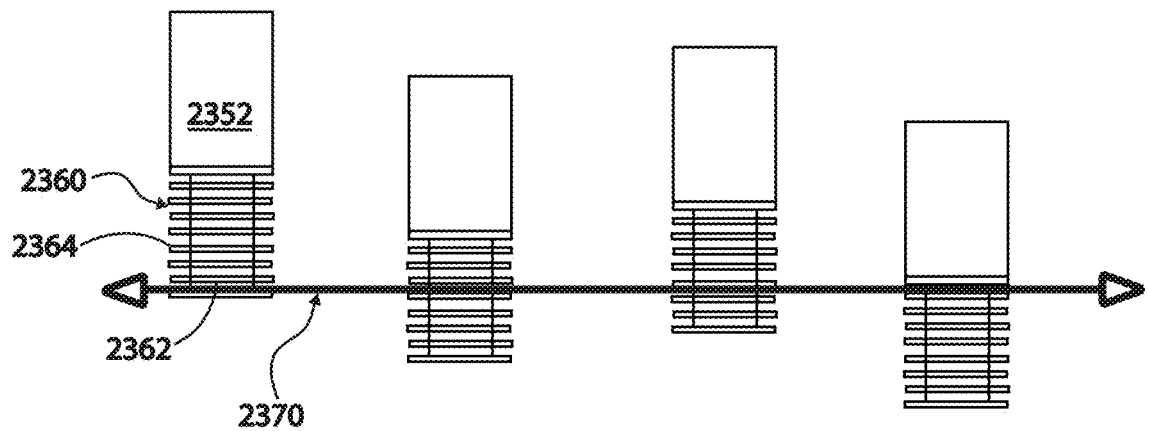
FIG. 60 is a perspective view of a lock that may be used with engagement members that incorporate a plurality of moveable pins to hold the pins in place.
Figure 61:
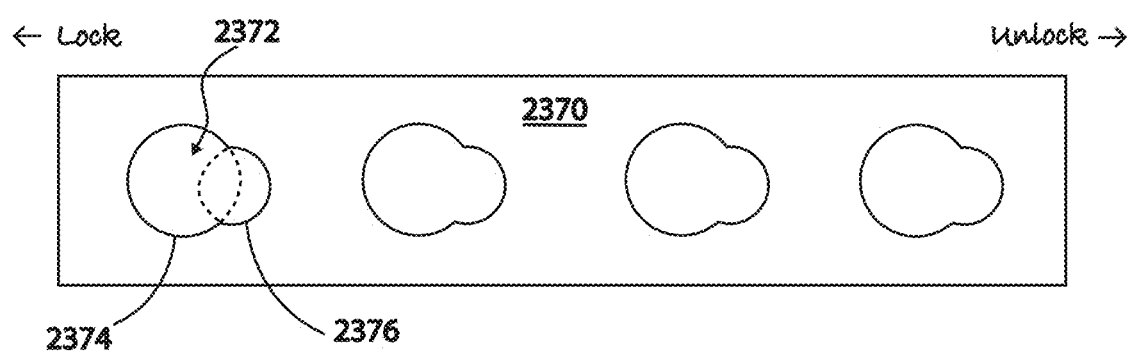
FIG. 61 is a front view of the lock plate for the lock of FIG. 60.

The lock can take the form of a brake, including but not limited to a friction brake that is moved into frictional engagement with the pins via a solenoid, linear actuator, or other movement mechanism. In another embodiment shown in FIGS. 60-61, the lock takes the form of a sliding lock plate 2370 with a plurality of apertures 2372 that each receive a pin 2352. Depending upon the configuration of the aperture 2372, the lock plate 2370 may be configured to slide laterally as shown between an unlocked position, where the pin 2352 can move freely in and out of the aperture 2372, and a locked position, where the pin 2352 is unable to move freely in and out of the aperture. The base of the pins 2352 may comprise a plurality of slots 2360 along the length of the pins 2352 that are configured to receive an edge of the aperture 2372 of the lock plate 2370. In that respect, the lock plate 2370 can lock a plurality of pins 2352 that are extended in retracted to different degrees, as best shown in FIG. 60. In the shown embodiment, the base of the pin comprises a reduced diameter shaft 2362 with a plurality of cylindrical fins 2364 with an increased diameter along its length that are spaced apart a distance equal to or slightly greater than the thickness of the lock plate 2372. The slots 2360 are defined by the space between the fins 2374. The aperture 2372 in the lock plate 2370 is defined by a first circular hole 2374 with a diameter equal to or slightly greater than the increased diameter of the fins 2364 and a second circular hole 2376 with a diameter equal to or slightly greater than the reduced diameter of the shaft 2362. The first circular hole 2374 and the second circular hole 2376 overlap, whereby the lock plate can have an unlocked position where the pin 2352 is centered with the first circular hole 2374 and a locked position where the pin 2352 is centered with the second circular hole 2376.

Figure 65:
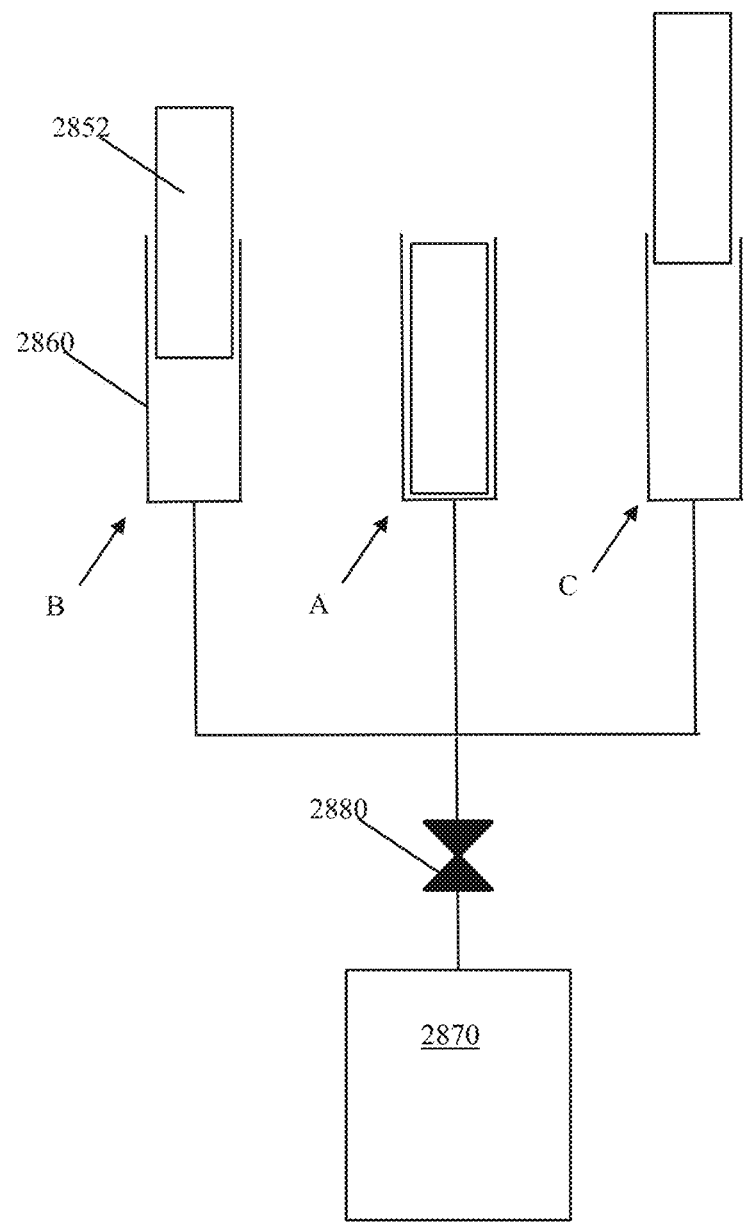

In another embodiment, the lock and biasing force for the pins may be provided pneumatically or hydraulically. For example, as shown in FIG. 65, each of the pins 2852 may sit in and be moveable along the length of a cylinder 2860 between a fully retracted position A and a fully extended position C at the extremes. Means may be provided to pressurize and/or evacuate the cylinders 2860 to provide outward biasing of the pin 2852 and or retract the pins 2852. More particularly, a plurality of pins 2852 may have a fully retracted position A (a storage position that eliminates obstructions for the wheeled mobility device as it enters the wheelchair securement area) that can be achieved by evacuating the cylinders 2860 of fluid or gas, and may have a fully extended position C by pressurizing the cylinders 2860 with fluid or gas. Some or all of the pins 2852 may encounter an obstruction (e.g., the side of a wheeled mobility device) and may only reach a partially extended position B, whereby the plurality of pins 2852 will match or correspond to the side contour of the wheeled mobility device. Once the plurality of pins 2852 are conformed to the contour of the wheeled mobility device, the cylinders 2860 can be individually or collectively isolated from the pressure source 2870 via one or more valves 2880 or flow restrictors, which locks the pins 2852 in place.

Figure 21:
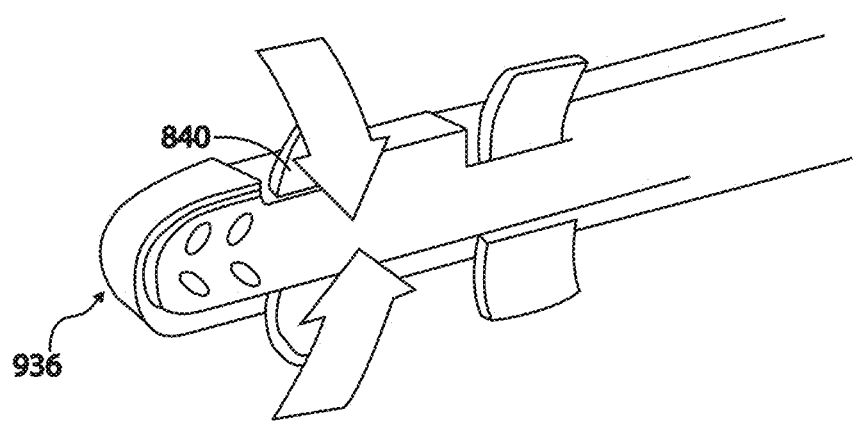
FIG. 21 is a perspective view of the gripping member of the ninth embodiment of the wheeled mobility device securement system.

In another embodiment, as shown in FIG. 21, the gripping member 936 could include one or more articulating contour-conforming members, such as paddles 940, that can move laterally and/or rotate to engage the chair geometry. The paddles 940 can be provided at any location on the gripping member 936, including at any point around the perimeter, or on the chair engaging face of the gripping member 936. The paddles 940 can protrude in a storage position, can be retracted behind a plane defined by the engaging surface of the gripping member, or can be recessed within the gripping member 936 in the storage position. The paddles 940 can take any shape and can be provided with various actuators or other mechanisms to effectuate movement. In the alternative, the paddles 940 can be passive in nature and be biased in an extended position using springs. It is contemplated that the paddles 940 may be used during regular operation, or may rapidly move into position during an accident through spring forces, pneumatics, pyrotechnics, compressed gas container or other motive forces.

Figure 22:
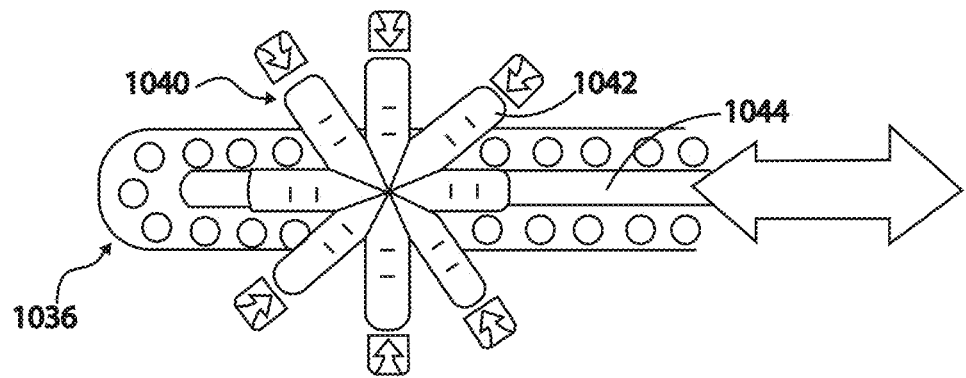
FIG. 22 is a perspective view of the gripping member of the tenth embodiment of the wheeled mobility device securement system.
Figure 47:
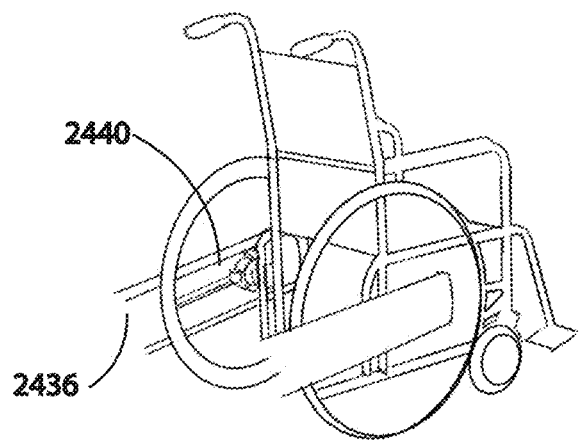
FIG. 47 is a perspective view of a securement member having an alternative embodiment of a gripping member that is designed to grip the hub of a wheel on a wheeled mobility device.

In another embodiment shown in FIG. 22, the gripping member 1036 can be provided with a wheeled mobility device engaging member 1040 that is moveable in a longitudinal direction in a rail or channel 1044 along the length of the gripping member and is configured with one or more contour-confirming members to grab a portion of the wheeled mobility device. As shown, the engaging member 1040 includes a plurality of fingers 1042 extending in a radial direction for grabbing wheel structures (e.g., the hub) on the wheeled mobility device. Each of the fingers 1042 may have one or more segments separated by joints or knuckles to allow the fingers 1042 to wrap around the wheel structure. Various actuators or other mechanisms may be used to effectuate movement of the engaging member 1040. Various intelligent sensor technologies, such as optical sensors, video analytics, or RFID tags, alone or in combination with artificial intelligence may be used to identify the model of wheeled mobility device and/or locate the wheel. An alternative embodiment of a gripping member 2436 with a wheeled mobility device engaging member 2440 is depicted in FIG. 47. Engaging member 2440 is similar to engaging member 1040 and designed to function in much the same way, but is smaller and is designed to grab the hub center of the wheels.

Figure 23:
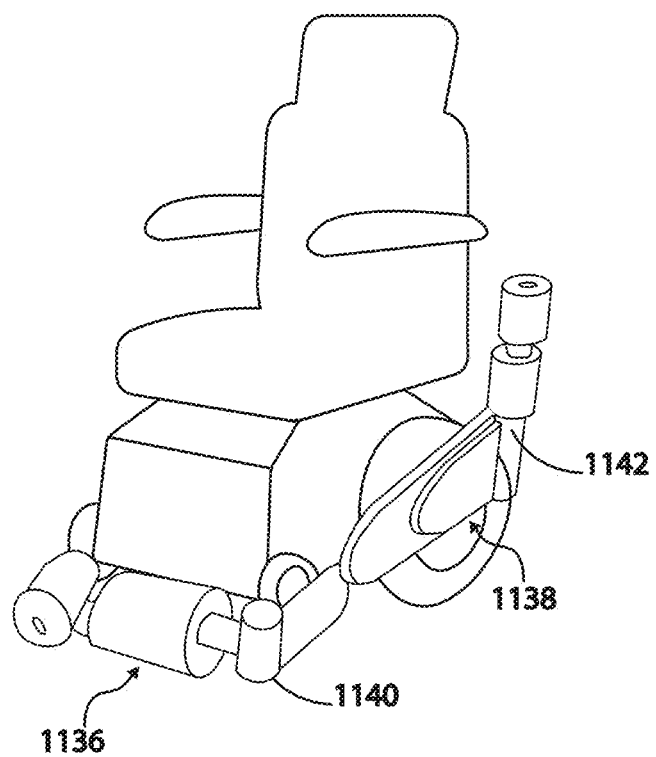
FIG. 23 is a perspective view of an eleventh embodiment of the wheeled mobility device securement system.
Figure 48:
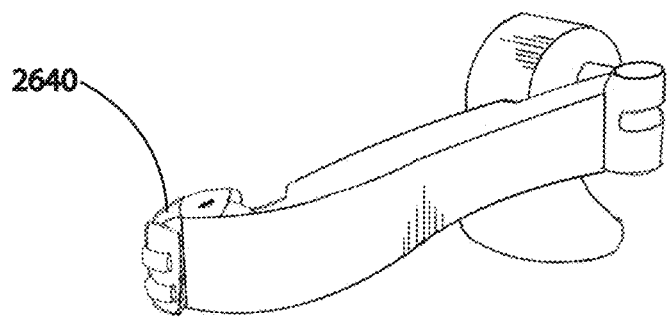
FIG. 48 is a perspective view of a securement member having an alternative embodiment of a gripping member that is designed to grip a frame member or other structure on a wheeled mobility device.

In yet other embodiments shown in FIG. 23, the wheeled mobility device securement system may take the form of one or a series of robotic arms, for example arms 1136, 1138, that are configured to secure a wheeled mobility device. Arms 1136, 1138 may include one or more segments, each separated by a joint 1140, 1142 that allows rotation about one or more axes. The arms may also include telescoping segments or other length-modifying structures that allow the length of each arm to be lengthened or shortened. Various intelligent sensor technologies, such as optical sensors, video analytics, or RFID tags, alone or in combination with artificial intelligence may be used to identify the chair or its configuration, whereby the arms could be guided from a stored position to a proper securement location, as shown. One or more of the arms could include structures that are designed to grab various structures on the wheeled mobility device, such as frame members, designated connection points, or wheel hubs, like the engaging members 1040 and 2440 grab the wheel hub as shown in FIGS. 22 and 47, or like the gripping hand 2640 is capable of grapping frame members and designated connection points as shown in FIG. 48. It is contemplated that the engaging members 1040 and 2440 may be used during regular operation, or may rapidly move into position during an accident through spring forces, pneumatics, pyrotechnics, compressed gas container or other motive forces.

Figure 24:
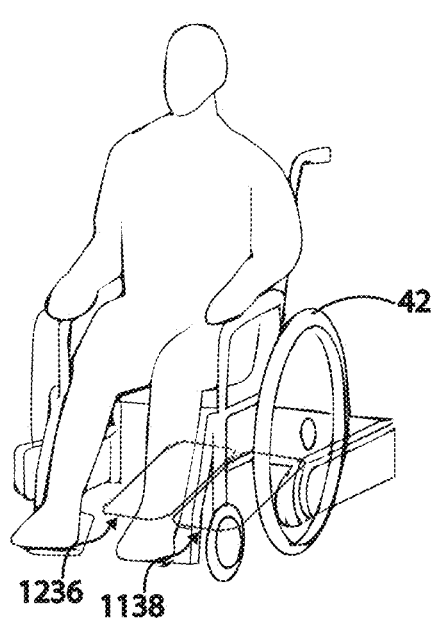
FIG. 24 is a first perspective view of a gripping member of an twelfth embodiment of the wheeled mobility device securement system, showing the gripping member in a stored position.
Figure 25:
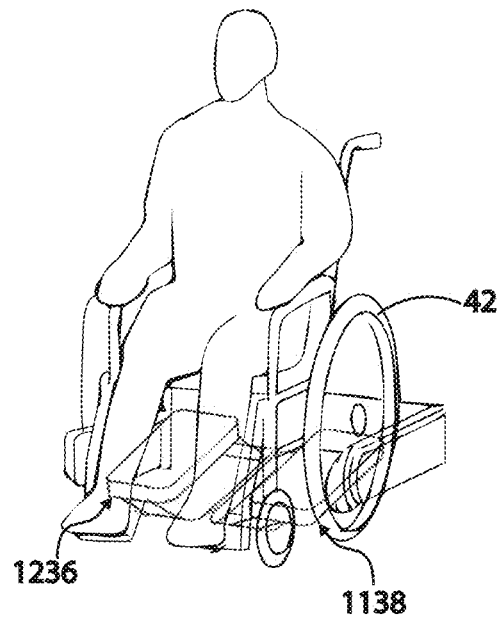
FIG. 25 is a second perspective view of the gripping member of the twelfth embodiment of the wheeled mobility device securement system, showing the gripping member in an extended position.

In yet other embodiments, the securement provided by the gripping members of FIGS. 1-23 and 31-47 can be replaced or supplemented through the use of gripping members 1236, 1238 shown in FIGS. 24-25 that may stow flush or in a very low profile in the floor of the vehicle. The gripping members 1236, 1238 are configured to move from a stored position to an engaged position where they make firm contact with the wheeled mobility device 42, and prevent movement through frictional engagement. For example, the gripping members 1236, 1238 may be provided with various actuators or other movement mechanisms (e.g., four bar mechanisms) that cause the gripping members 1236, 1238 to deploy in an upward and outward direction until they make firm contact with the inside edges of the wheels of the wheeled mobility device 42, or other inward-directed faces of the wheeled mobility device 42. The gripping members 1236, 1238 remain low to avoid conflict with the underside of the wheeled mobility device 42 and to stabilize the wheel near the floor. When combined with the gripping members of FIGS. 1-23, which engage with external faces of the wheeled mobility device, the gripping members 1236, 1238 provide stabilization and reaction forces for the external gripping members. The stabilization and reaction forces provided by the gripping members 1236, 1238 may allow the external gripping members to squeeze at a higher force level without causing damage to the wheeled mobility device. It is contemplated that the secondary gripping members 1236, 1238 may be used during regular operation, or may rapidly move into position during an accident through spring forces, pneumatics, pyrotechnics, compressed gas container or other motive forces.

Figure 26:
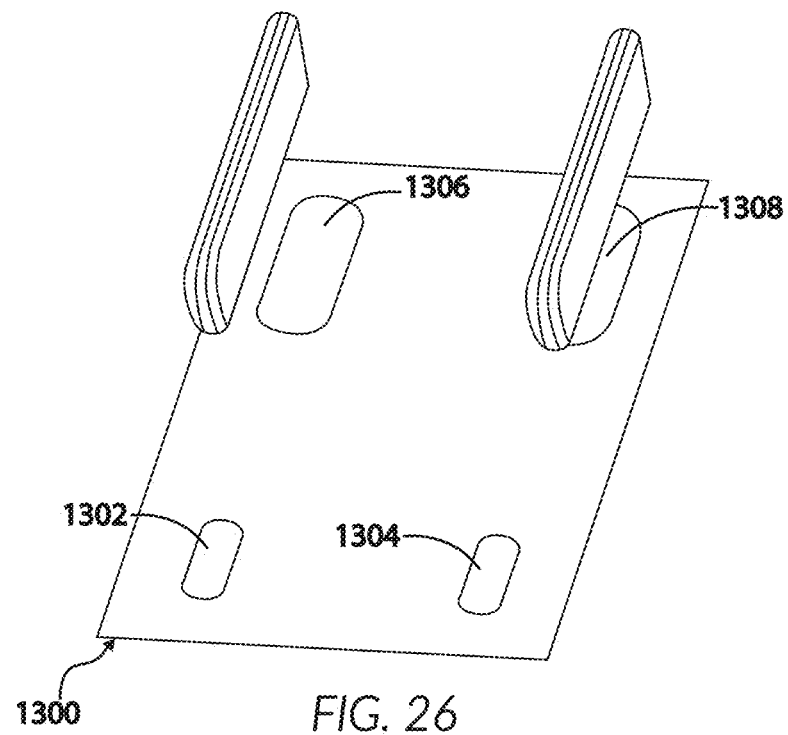
FIG. 26 is a perspective view of a position sensor pad for detecting a wheeled mobility device being secured by the thirteenth embodiment of the wheeled mobility device securement system.

To further improve the capture security of the wheeled mobility device, various combinations of sensors, including those described above, can be provided to determine, among other things, the precise location of the wheeled mobility device in the vehicle, the model or type of wheeled mobility device, the individual and total combined weight of the wheeled mobility device and passenger, and whether the wheeled mobility device is moving or stationary. The wheeled mobility device may also be monitored for movement during transit, and an alert may be provided, for example, to the vehicle operator, if excessive movement is detected or if any other fault in the wheeled mobility device securement system is detected. For example, as shown in FIG. 26, a position sensor pad 1300 can be provided to determine when the wheeled mobility device station is occupied with a wheeled mobility device, where the wheeled mobility device is located in the station, the combined weight of the wheeled mobility device and passenger, whether the wheeled mobility device is stationary or moving, and if the wheeled mobility device is in a proper securement position. Based on, for example, wheel number and position 1302, 1304, 1306, 1308, the sensor pad 1300 can provide data indicative of the type of item in the station. Notably, the pad 1300 can take the form of a single unitary pressure sensitive sheet, or an array of pressure sensitive strips or points.

Figure 27:
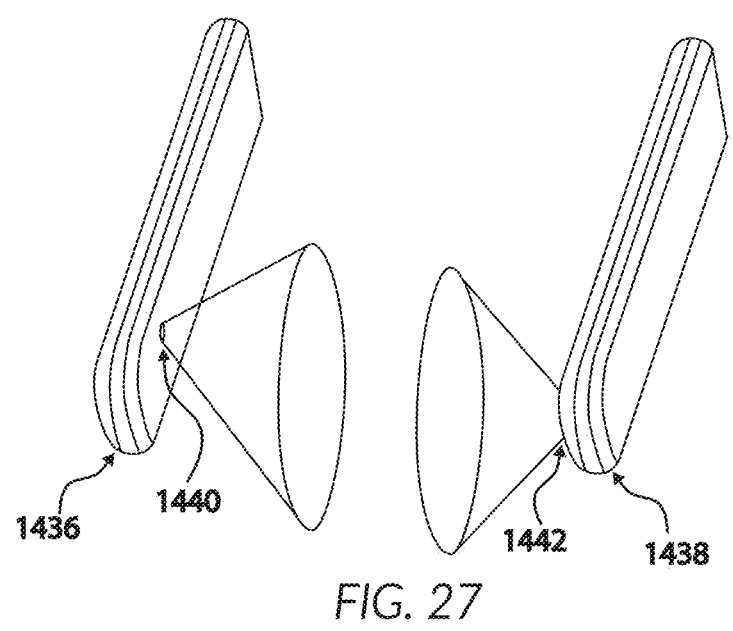
FIG. 27 is a perspective view of a proximity sensor for detecting a wheeled mobility device being secured by the fourteenth embodiment of the wheeled mobility device securement system.

In another embodiment, the gripping members 1436, 1438, or other structure in the vehicle, can be provided with one or more proximity sensors 1440, 1442 to sense the presence and detect the position of various surfaces on the wheeled mobility device. When present on the gripping members 1436, 1438, as shown in FIG. 27, the gripping members 1436, 1238 can react when the sensors 1440, 1442 sense the presence of an item to either grip the wheeled mobility device or to avoid contact with an obstructing item.

Figure 28:
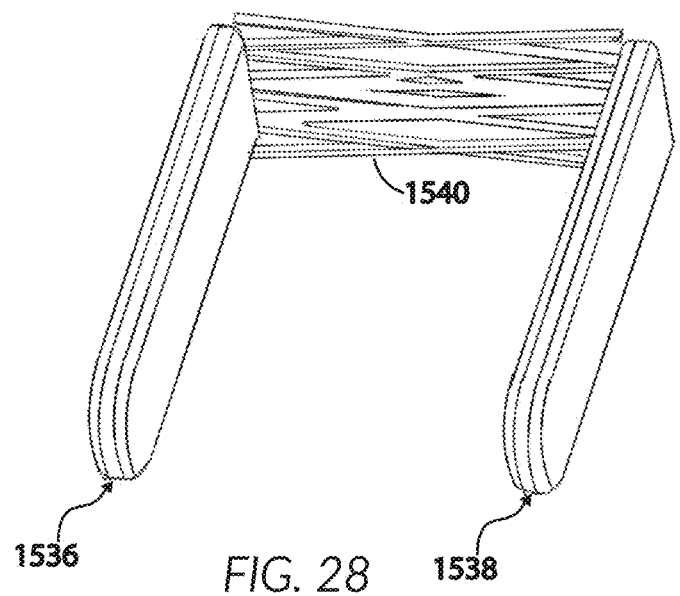
FIG. 28 is a perspective view of a first infrared sensor array for detecting a wheeled mobility device being secured by the fifteenth embodiment of the wheeled mobility device securement system.
Figure 29:
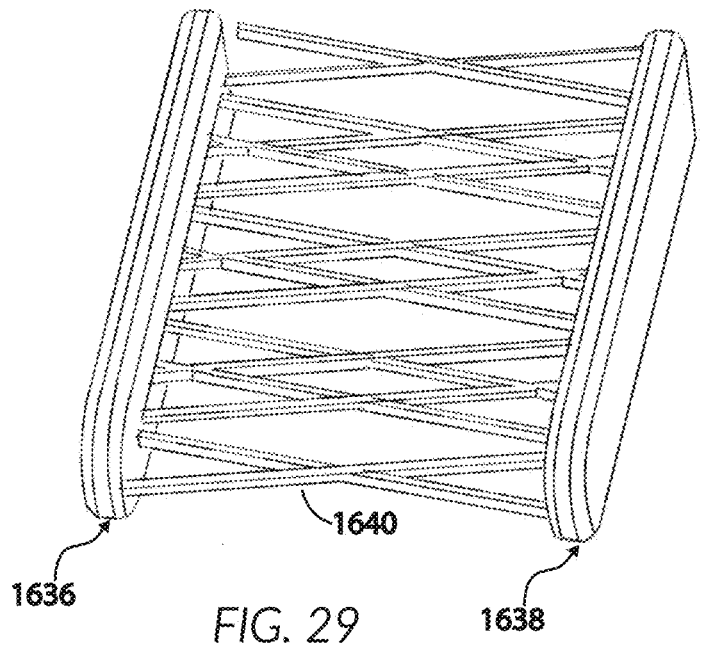
FIG. 29 is a perspective view of a second infrared sensor array for detecting a wheeled mobility device being secured by the sixteenth embodiment of the wheeled mobility device securement system.
Figures 31, 32:
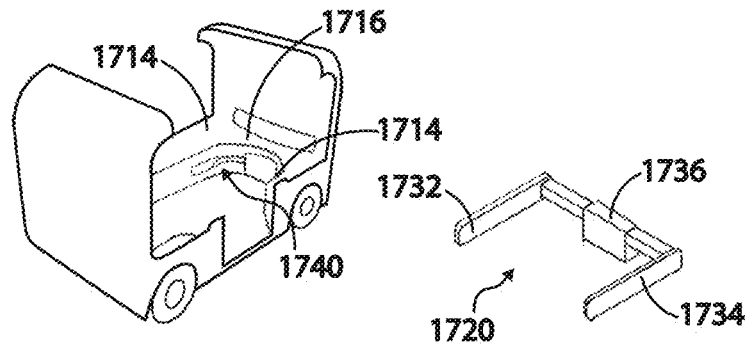
FIG. 31 is a perspective view of an alternative autonomous vehicle that incorporates an alternative embodiment of a wheeled mobility device securement system.
FIG. 32 is a perspective view of the alternative embodiment of the wheeled mobility device securement system of FIG. 31.
Figures 33, 34:
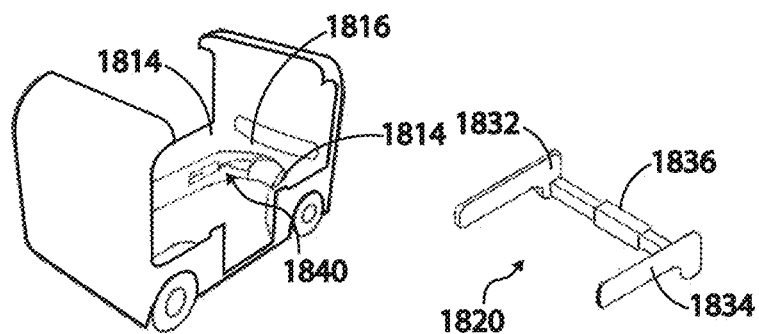
FIG. 33 is a perspective view of another alternative autonomous vehicle that incorporates another alternative embodiment of a wheeled mobility device securement system.
FIG. 34 is a perspective view of the alternative embodiment of the wheeled mobility device securement system of FIG. 33.
Figures 35, 36:
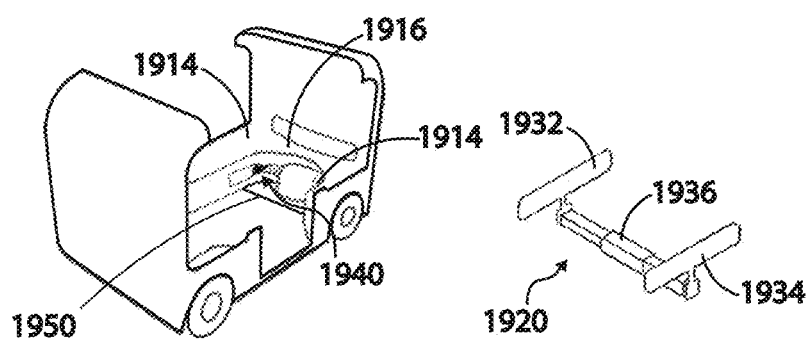
FIG. 35 is a perspective view of another alternative autonomous vehicle that incorporates another alternative embodiment of a wheeled mobility device securement system.
FIG. 36 is a perspective view of the alternative embodiment of the wheeled mobility device securement system of FIG. 35.
Figure 43:
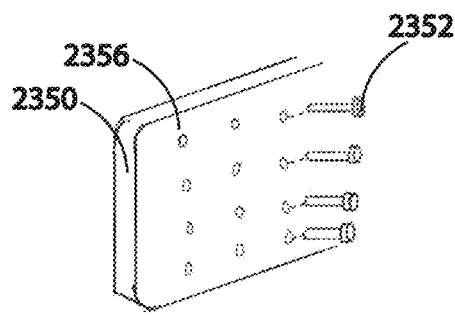
FIGS. 43-46 are various perspective views of engagement members that incorporate a plurality of spring biased pins to engage with various structures and contours on the side of the wheeled mobility device.
Figure 44:
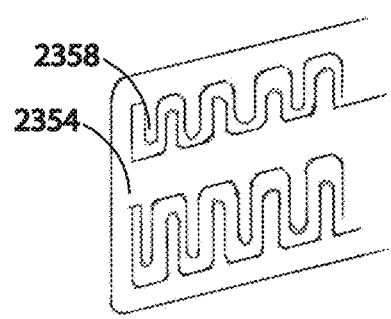
Figure 45:
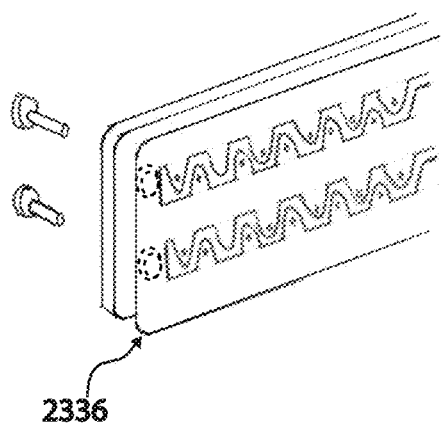
Figure 46:
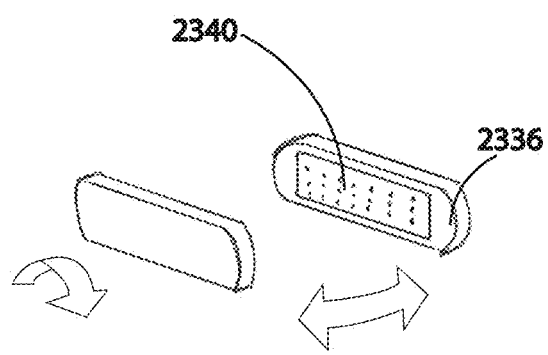

In yet other embodiments shown in FIGS. 28-29, the gripping members 1536, 1538, 1636, 1638, or other structure in the vehicle, can be provided with one or more infrared beam projectors and receivers to sense the presence and detect the position of a wheeled mobility device, where a projector would be disposed on one of the gripping members, and the corresponding receiver would be disposed on the opposite gripping member. The infrared beam projectors may be provided in an array 1540 extending in a vertical direction, an array 1640 extending in a longitudinal direction, an array (not shown) extending in a lateral direction (e.g., one or more of the projector or receiver could be located at the rear of the station between the members 1536, 1538, for example on a back rest), or a combination of arrays thereof. The infrared beam projectors may be configured and positioned to identify the location of the front, rear, and sides of the wheeled mobility device.

The proximity sensors 1440, 1442 and IR arrays 1540, 1640 can also be used to determine a side profile of the wheeled mobility device, which can be subsequently used to the prepare the securement surfaces of the securement members so that the shape of the securement surfaces match the side profile of the wheeled mobility device. This can be done through the use of multiple expansion members (e.g., inflatable bellows) located along the length of the securement member, or through the use of securement member having multiple segments that are moveable relative to each other, either laterally or rotationally or both.

Figure 49:
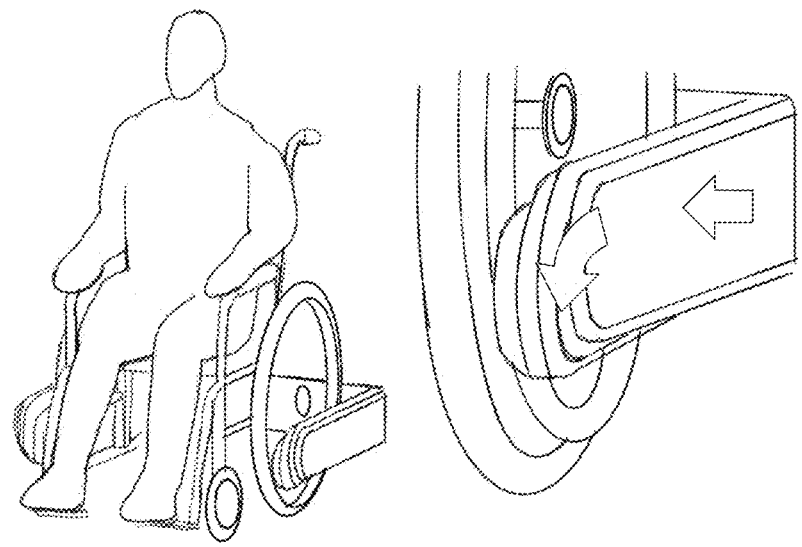
FIG. 49 depicts a safety system that provides additional squeezing and downward force for the securement members.

As shown in FIG. 49, the securement members may be provided with various fast-acting devices, such as spring forces, pneumatics, pyrotechnics, compressed gas container or other motive forces, that cause the securement members to provide additional squeeze force and/or a rotational down force during adverse driving conditions to improve WMD securement, for example during long-dwell maneuvering loads as seen when busses round traffic circles or negotiation fast freeway on-ramps. Higher additional forces, even those that may cause damage to the wheeled mobility device, can be applied during a crash event as a means to improve securement and safety during impacts.

Figure 50:
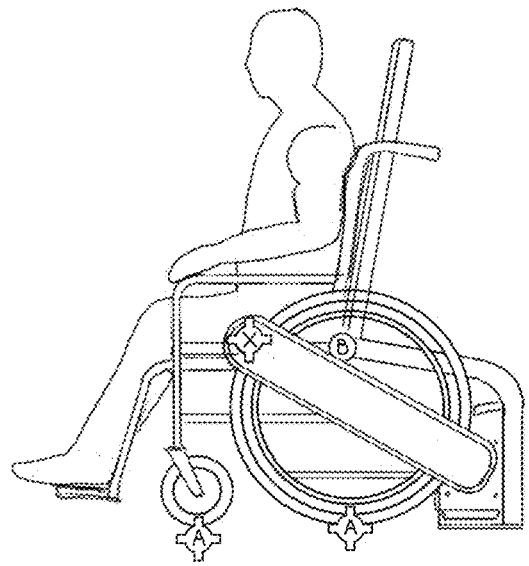
FIG. 50 depicts ideal contacts points in the securement of a wheeled mobility device.

As shown in FIG. 50, in one embodiment, there could be three primary contact points: (A) the floor plane contact; (B) the backrest contact; and (X) an adjustable third point securement. To prevent tipping, point X can be located above the wheel axle line, and the end of the securement member can be provided with an appendage that folds over the top of the wheel. In any event, an autonomous system may use the information gained from various sensors that are indicative of the type, configuration, location, and weight of the to-be-secured wheeled mobility device and/or occupant: (1) to locate an ideal location on the wheeled mobility device for contact by the securement member; and (2) to direct the securement member to move to that location.

Figure 51:
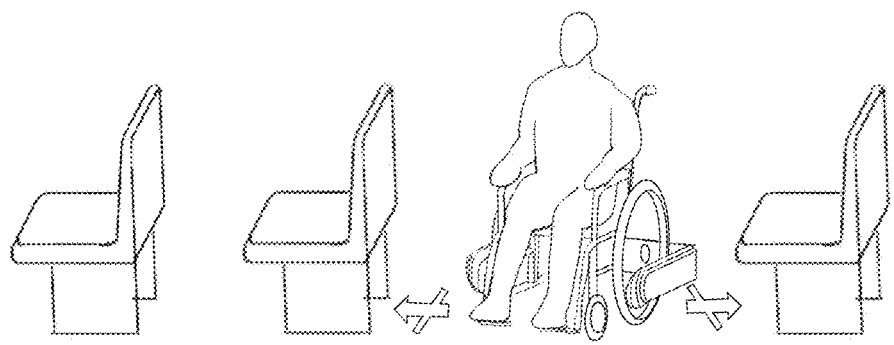
FIG. 51 depicts a wheeled mobility device secured in a side-facing position.

As shown in FIG. 51, the securement members can contain a lock or friction mechanism so that they can take lateral loads to capture the device in a side-seating station.

Figure 52:
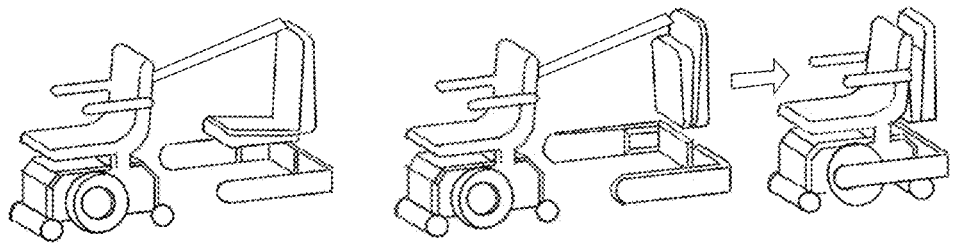
FIG. 52 depicts an automatic lifting seat.

As shown in FIG. 52, the securement system can be configured to detect the presence of the WMD and to automatically fold the seating (e.g., a motorized seat) for ambulatory passengers to clear the securement area and make it ready for securement. The system can also include visual (lights), audible (sounds), or tactile indicators (seat vibrators) that notify seated passengers of the WMDs presence and need to clear the area.

Figure 53:
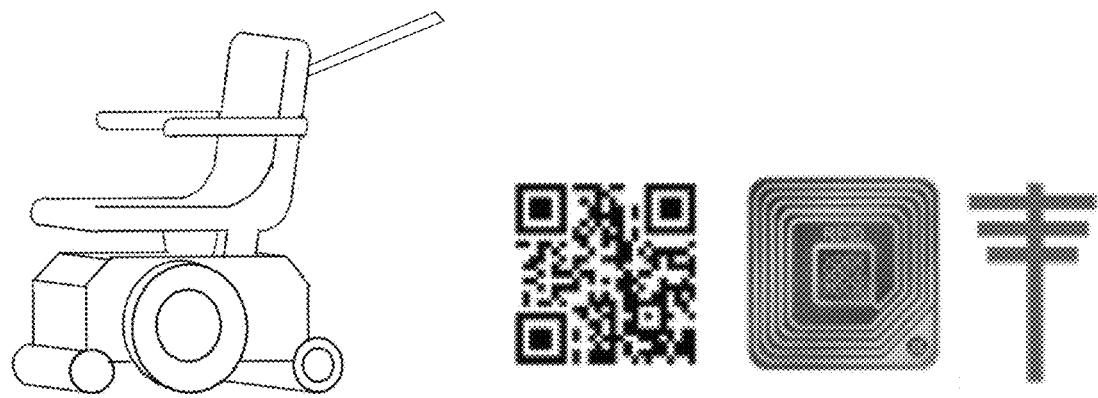
FIG. 53 depicts various ways in which to identify characteristics of a wheeled mobility device.

As shown in FIG. 53, the securement system may incorporate one or more sensors to identify the presence and type of WMD by employing a QR code or bar code or RFID technology, which may be located anywhere on the WMD. The securement system could also read a manufacturer's or other label on the WMD. The vehicle can also receive wireless notification from a central dispatch ahead of time that indicates a WMD will be boarding and will require access to the wheelchair station, along with other information such as the individual and/or combined weight of the WMD and passenger, and the pick up and drop off locations. The specific type of WMD can be transmitted with the notification from the central dispatch so that adequate preparations are made.

The securement system could also be configured for connection to a vehicle to infrastructure or vehicle to vehicle communication systems, whereby the securement system could identify in advance the characteristics of a to-be-secured WMD and its passenger. For instance, the securement system could be configured to be compatible with or to have one- or two-way communication in an automated driving system, with robotic operating software, or with cooperative automation research mobility applications.

Figure 54:
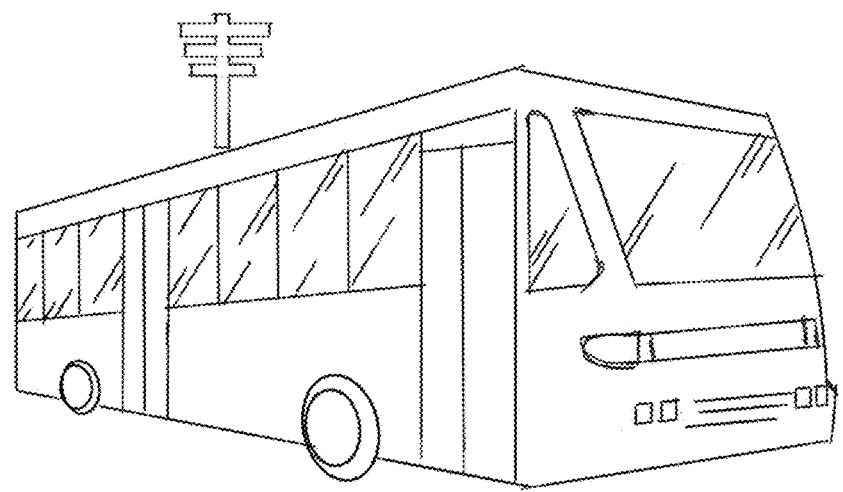
FIG. 54 depicts a bus with wireless communication capabilities.

As shown in FIG. 54, the securement system incorporates one or more sensors to identify the presence and type of WMD. This information may be transmitted wirelessly from the vehicle to a central dispatch facility where it is processed. The occupancy information can then be redistributed to other transit users via apps, email, text, etc. to aid their travel planning. Waiting passengers can reserve use of the wheelchair station to aid route planning and/or vehicle preparation, while improving transit efficiency. Waiting wheelchair users may then choose other options when they see that all wheelchair stations are occupied on a particular vehicle that they were planning to board.

Figure 55:
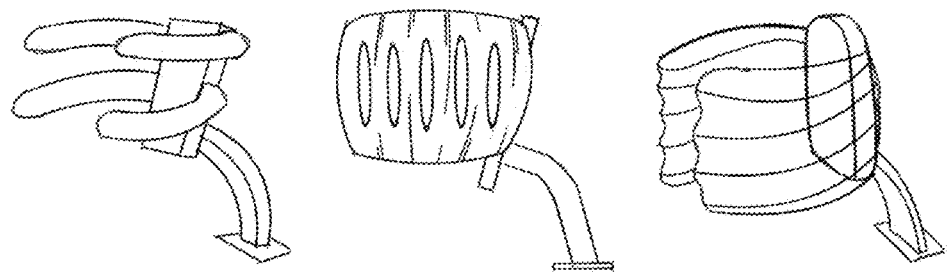
FIGS. 55-57 depict various airbags that can be deployed during adverse driving conditions.
Figure 56:
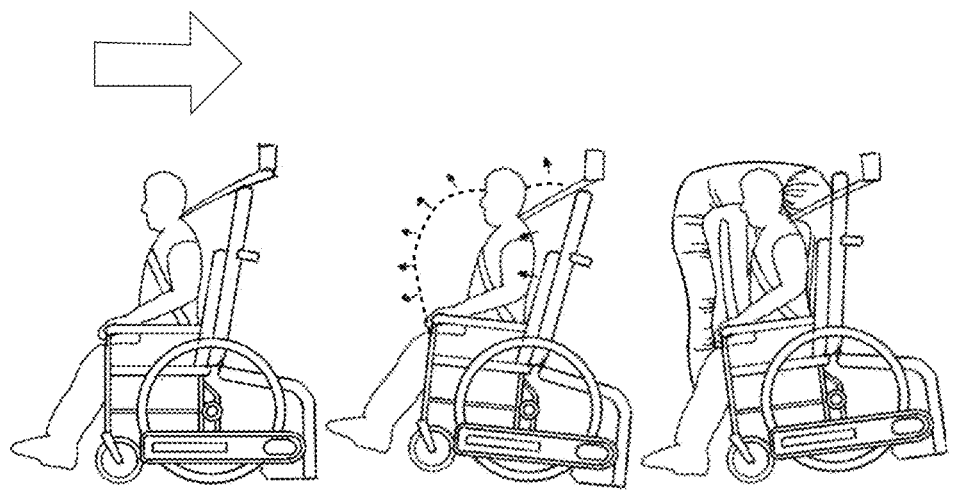
Figure 57:
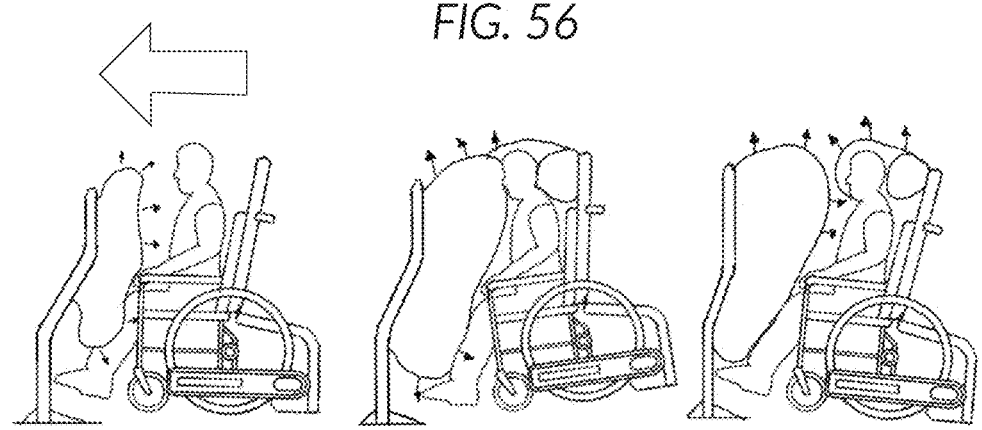

As shown in FIGS. 55-57, the securement system can be equipped with cushioning airbags for one or both of the wheeled mobility device and passenger. After receipt of a crash signal from either the vehicle or various sensors (e.g., accelerometer) provided by the system, airbags located in a backrest, a front barrier, the securement members, or other structure in the vehicle can be deployed in different ways according to the type of accident encountered to absorb energy and protect the wheelchair occupant.

Figure 58:
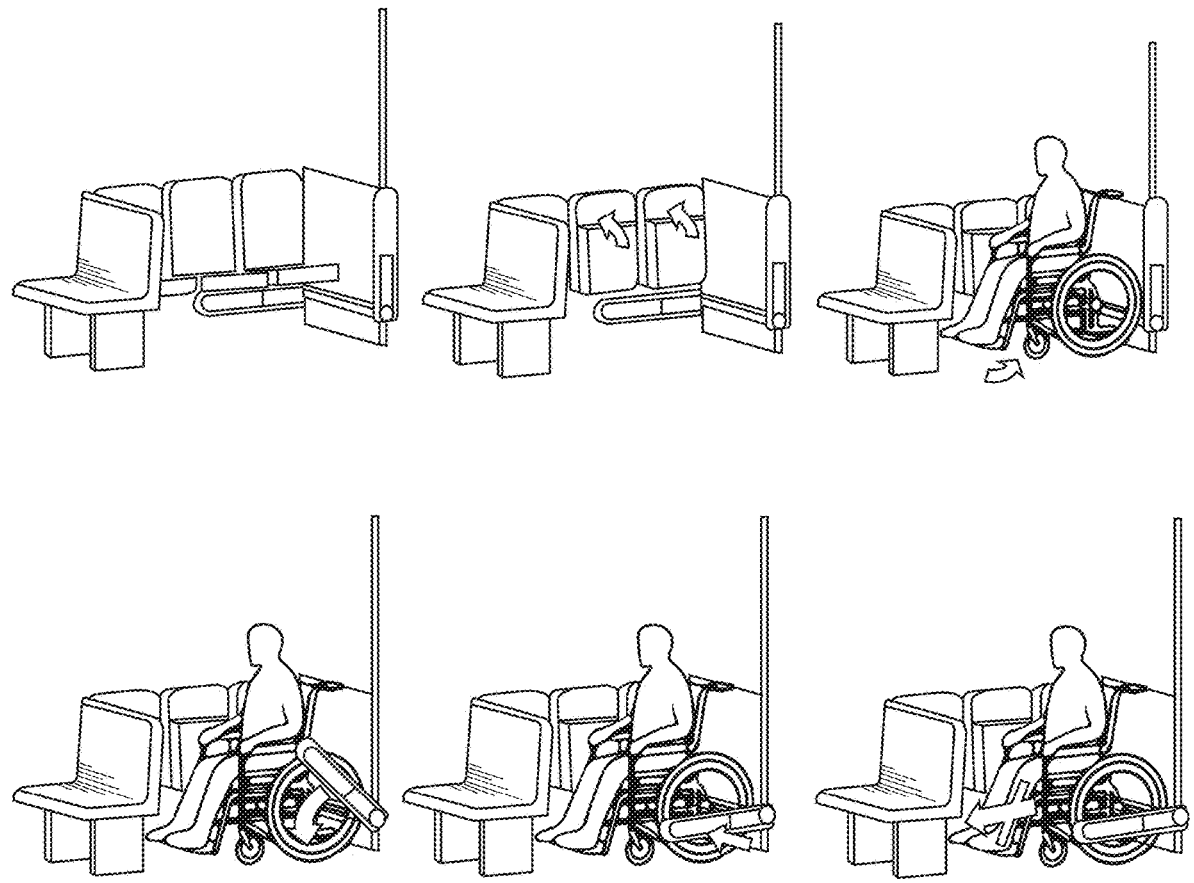
FIG. 58 depicts a pole mounted securement member.

As shown in FIG. 58, the securement member can be pole or barrier mounted. Upon sensing the presence of a WMD, the securement area can be cleared (raise seats) and the securement members can be maneuvered into position. The securement member can rotate about an axis located at its base, as shown, or could rotate along an axis located anywhere along the length of the securement member. In addition, the rotational axis can be moveable along the length of the securement member. In such an embodiment, the securement member is suitable for use in an intelligent system that determine an optimal location for the securement member to contact the WMD (see FIG. 50, as described above). In addition, while shown mounted to an aisle-side of the pole, it could be mounted to a wall-side of the pole.

Figure 59:
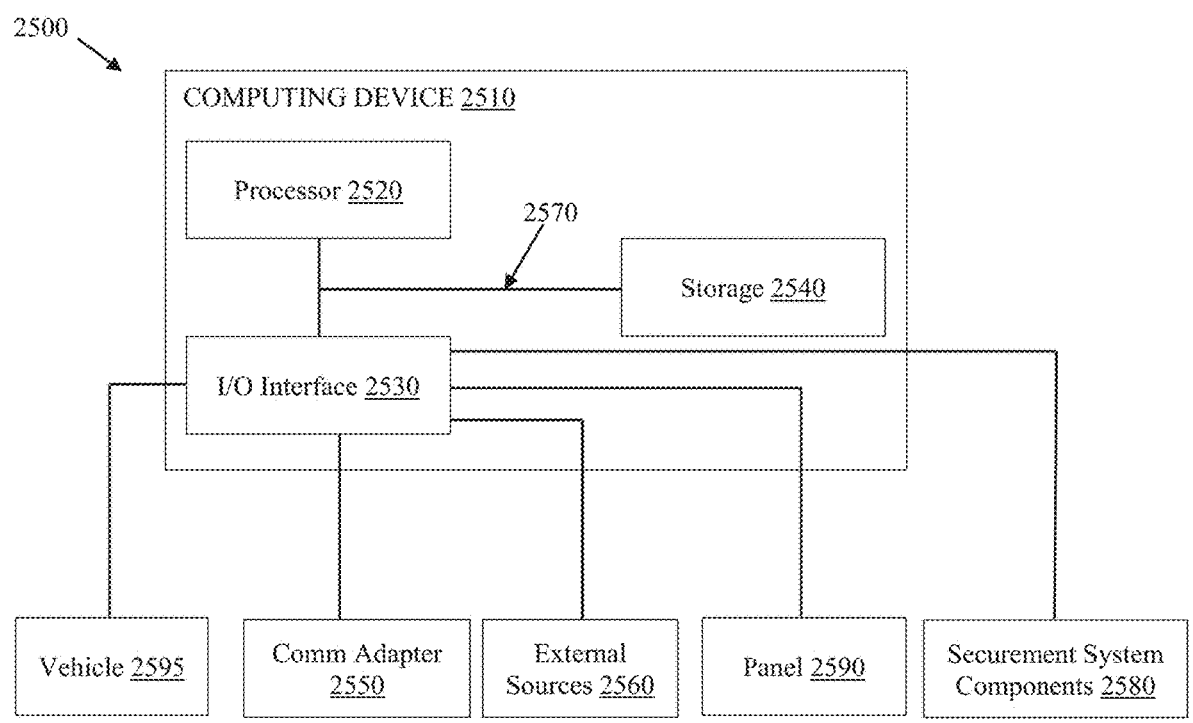
FIG. 59 depicts a computing device configured to perform the various autonomous securement methods described herein.

FIG. 59 shows a system 2500 by which the exemplary embodiments can be automated. The system 10 may include a computing device 2510 that can perform some or all of the processes described above and below. The computing device 2510 may include a processor 2520, storage 2540, a protected input/output (I/O) interface 20, and a communications bus 2570. The bus 2570 connects to and enables communication between the processor 2520 and the components of the computing device 2510 in accordance with known techniques. Note that in some systems, there may be multiple computing devices and, in some computing devices, there may be multiple processors incorporated therein.

The processor 2520 communicates with storage 2540 via the bus 2570. Storage 2540 may include memory, such as Random Access Memory (RAM), Read Only Memory (ROM), flash memory, etc., which is directly accessible. Storage may also include a secondary storage device, such as a hard disk or disks (which may be internal or external), which is accessible with additional interface hardware and software as is known and customary in the art. Note that a computing device 2510 may have multiple memories (e.g., RAM and ROM), multiple secondary storage devices, and multiple removable storage devices (e.g., USB drive and optical drive).

The computing device 2510 may also communicate with other computing devices, computers, workstations, etc. or networks thereof through a communications adapter 2550, such as a telephone, cable, or wireless modem, ISDN Adapter, DSL adapter, Local Area Network (LAN) adapter, or other communications channel. Note that the computing device 2510 may use multiple communication adapters for making the necessary communication connections (e.g., a telephone modem card and a LAN adapter). The computing device 2510 may be associated with other computing devices in a LAN or WAN. All these configurations, as well as the appropriate communications hardware and software, are known in the art.

The computing device 2510 provides the facility for running software, such as Operating System software and Application software. Note that such software executes tasks and may communicate with various software components on this and other computing devices. As will be understood by one of ordinary skill in the art, computer programs such as that described herein are typically distributed as part of a computer program product that has a computer useable media or medium containing or storing the program code. Such media may include a computer memory (RAM and/or ROM), a diskette, a tape, a compact disc, a DVD, an integrated circuit, a programmable logic array (PLA), a remote transmission over a communications circuit, a remote transmission over a wireless network such as a cellular network, or any other medium useable by computers with or without proper adapter interfaces The computing device 2510 may be located onboard the WMD securement system, or may be located remotely in the vehicle or elsewhere. In general, the computing device 2510 is programmed to or includes a computer program product configured to automate one or more steps in the securement of a wheeled mobility device in a securement system, such as the securement systems described herein. The computing device 2510 may operate with machine language and receive information, signals, data or input from one or more sensors, devices, or external sources (collectively 2560) associated with the wheeled mobility device or the securement system, to inform the securement process. The computing device may also receive additional information, signals, data or input, including from the storage 2540 and/or one or more communications adapter 2550, the vehicle 2595, and user panels 2590. The computing device 2510 may then determine appropriate actions and initiate them via designated outputs. For example, the computing device 2510 may issue instructions, in the form of signals, to various components in the securement system such as lighting, audible alarms and ancillaries, as well as motor controls (collectively 2580), according to logical algorithm included with the computer program product.

The processor 2520 can communicate with the vehicle operator thru one or more interface panels 2590. The panels 2590 can contain command switches or buttons that produce signals, as well as indicator lights, audible alarm, voice, with optional text or full graphic displays with touch-sensing capabilities. The panels 2590 could be a wall-mounted unit, a wired or wireless remote control, or even an application running on a tablet or mobile device, such as an iPhone. The computing device 2510 can also communicate directly with the vehicle's controller 2595 to send information regarding the status of the securement system, as well as to receive information concerning the status of the vehicle. The computing device 2510 can also communicate with a central monitoring facility through the communications adapter 2550.

Embodiments of the computing device 2510 may be configured to receive one or more inputs from the vehicle controller or vehicle collision detection system 2595 that are indicative of one or more of the following vehicle conditions: vehicle stopped, vehicle neutralized (out of gear, in park, powered down, etc.), vehicle brake applied, vehicle doors opened, acceleration/deceleration (along all three axes), distance from objects (along all three axes), speed (along all three axes), moment of impact, probability of impact, estimated time of impact, among other information well known to be obtainable from the vehicle. It is contemplated that the securement system may include its own vehicle collision detection system, sonar systems, accelerometers and/or geolocation equipment (e.g., gps), from which the relevant information can be obtained.

Embodiments of the computing device 2510 may also be configured to receive one or more inputs from one or more sensors or other devices 2560 that are indicative of a wheeled mobility device being present on the vehicle. Those sensors or devices 2560 may include the floor pressure sensor 1300, the IR beams 1540, 1640, a WMD-mounted or occupant-retained RFID tag, WMD-mounted or occupant-retained QR or bar code, and/or a camera and image recognition software.

Embodiments of the computing device 2510 may also be configured to receive one or more inputs from one or more sensors or other devices 2560 that are indicative of the occupancy status of the WMD securement system and/or the position of the WMD in the vehicle/WMD securement system. Those sensors or other devices 2560 include the floor pressure sensor 1300, the IR beams 1540, 1640, a WMD-mounted or occupant-retained RFID tag, WMD-mounted or occupant-retained QR or bar code, and/or a camera and image recognition software.

Embodiments of the computing device 2510 may also be configured to receive one or more inputs from one or more sensors or other devices 2560 that are indicative of the type, size, and/or individual or combined weight of wheeled mobility device and passenger being secured. Those sensors or other devices 2560 include the floor pressure sensor 1300, the IR beams 1540, 1640, a WMD-mounted or occupant-retained RFID tag, WMD-mounted or occupant-retained QR or bar code, and/or a camera and image recognition software.

Embodiments of the computing device 2510 may also be configured to receive one or more inputs from one or more sensors or other devices 2560 that are indicative of the position and/or deployment status of the gripping members or other components of the WMD securement system. Those sensors or devices 2560 may include motor current sensors (e.g., for the gripping member motors), the IR beams 1540, 1640, the proximity sensors 1440, 1442, camera and image recognition software, squeeze force sensors, and/or arm position sensors. The detected deployment statuses can include a retracted or stored position, extended or secured position (contacting the WMD), or any intermediate position (spaced from WMD, contacting WMD by not secured, etc.).

Embodiments of the computing device 2510 may also be configured to receive one or more inputs from one or more sensors or other devices 2560 that are indicative of the WMD movement while the vehicle is in transit. Those sensors or devices 2560 may include motor current sensors (e.g., for the gripping member motors), the IR beams 1540, 1640, the proximity sensors 1440, 1442, camera and image recognition software, squeeze force sensors, tension sensors (including those on wheelchair tie-downs), and/or arm position sensors. Based on signals received from those devices at different times during transit, the computing device may detect movement and alert the vehicle operator via visual, auditory, or tactile alerts.

Embodiments of the computing device 2510 may also be configured to receive one or more inputs from one or more sensors or other devices 2560 that are indicative of the loss of squeezing force during transit. Those sensors or devices 2560 may include motor current sensors (e.g., for the gripping member motors), the IR beams 1540, 1640, the proximity sensors 1440, 1442, camera and image recognition software, squeeze force sensors, and/or arm position sensors. Again, the computing device may detect these faults in the securement system and alert the vehicle operator via visual, auditory, or tactile alerts.

Embodiments of the computing device 2510 may also be configured to receive one or more inputs from one or more sensors or other devices 2560 that are indicative of whether the gripping arm path is clear of obstructions. Those sensors or devices 2560 may include the floor pressure sensor 1300, the IR beams 1540, 1640, motor current sensors (e.g., for the gripping member motors), camera and image recognition software, squeeze force sensors, and/or arm position sensors.

Embodiments of the computing device 2510 may also be configured to receive one or more inputs from one or more sensors or other devices 2560 that are indicative of the distance between the gripping members and the wheeled mobility device. Those sensors or devices 2560 may include the floor pressure sensor 1300, the IR beams 1540, 1640, the proximity sensors 1440, 1442, camera and image recognition software, and/or arm position sensors.

Notably, the computing device 2510 has the ability to calculate various parameters based on the sensed parameters. For example, a system that is configured to sense the position of the wheeled mobility device and the position of the gripping member or other WMD securement system component, need not have a separate sensor to detect the distance between them—that distance can be calculated. Similarly, if the distance between the gripping member and the gripping member is sensed, the system need only be configured to sense one of the positions and can calculate the other position.

The computing system 2510 can be configured to detect when a WMD enters the vehicle or enters the securement area and to respond by preparing the system and/or securement area for securement. For example, the computing system 2510 can detect whether the floor area is clear and, if not, provide visual, auditory or other sensory notice that the floor area is not clear. As another example, the computing system 2510 could detect whether seating for ambulatory passengers is clear and/or moved into a retracted position and, if not, provide visual, auditory or other sensory notice of the same. As another example, in response to detecting that a WMD has entered the vehicle, the computing system could trigger seats to retract to a stored position and, optionally provide visual, audible, or vibratory alerts for the seated passengers that that the seats are moving.

The computing system 2510 can also be configured to initiate the securement sequence once it is detected or determined that the WMD is in a correct position for securement. For example, the computing system 2510 can detect the location of the WMD and determine whether the WMD is off-center, both laterally and longitudinally. If the distance from center exceeds a predetermined threshold, the computing system 2510 can terminate the securement sequence and provide visual, audible, or vibratory alerts. If the distance from center is within the predetermined threshold, the computing system 2510 can proceed with the securement sequence and, optionally, adjust the sequence to accommodate or adapt to the off-center location. For example, in systems that provide independent control of the securement members, the securement members can be independently moved (one more than the other) to accommodate the asymmetrical position of the WMD.

The computing system 2510 can also be configured for fully autonomous securement. Such a computing system could detect when a WMD enters a vehicle and/or enters the securement area. The computing system could then prepare the securement system and area for securement. The computing system could then sense whether the WMD is positioned properly in the securement area. The computing system could then sense whether the WMD is stationary. The computing system could then sense whether the paths of the securement members are clear. Assuming one or more or all of these criteria are met, the computing system could then activate the securement system to move the securement members into place, without requiring any input from the vehicle attendant of WMD passenger.

The computing system 2510 could also be configured to detect and/or receive information indicative of various characteristics of the WMD and the passenger, as described above. In response, the computing system could be configured to adjust various characteristics of the securement members, such as the force applied to the WMD, the shape of the securement members (e.g., to match side profile of WMD), the location of the securement members when they contact the WMD, and which securement and/or safety devices to use. The computing device 2510 may be programmed to check a locally or remotely stored database or look-up table that provides the ideal securement characteristics for any given type or model of WMD, or any specific passenger.

Once the WMD is secured, the computing device could include an interlock that prevents release of the WMD from the securement system. For example, the computing device could receive a first signal that is indicative of whether the vehicle is safely stopped. The computing device could also optionally receive a second signal that is indicative of the correction location for the passenger to disembark the vehicle. The computing device would prevent release of the system unless the vehicle is safely stopped and/or unless the vehicle is located at the proper location for the passenger to disembark. In an autonomous system, the computing device would trigger the securement system to release the WMD when the vehicle is safely stopped and the vehicle is located at the proper location for the passenger to disembark.

Also, once the WMD is secured, the computing device could be configured to sense an adverse driving condition and/or to receive a signal or signals indicative of an adverse driving condition. Upon gaining such information, the computing device could activate one or more supplemental safety system for additional securement of the wheelchair. This could include the various safety systems discussed above, such as providing additional squeezing force and/or downward movement or rotation to the securement members, inflation of bladders inside of the securement members, energizing magnetorheological fluid present inside of the securement members, moving into place various contours, knobs, paddles, fingers, and other grippers and extremities located on the securement member, grabbing various structures on the WMD such as wheel hubs, supplemental gripping members that engage the inward facing surfaces of the WMD wheels, and airbags.

The computing device 2510 may be programmed to control the "squeezing" process, where the gripping members move from their first, stored position, to their second, WMD engaged position. The computing device 2510 may also be programmed to maintain sufficient "squeezing force" after the gripping members have been moved into their second, WMD engaged position. In such processes, the computing device 2510 will send a signal to the motor controller (included within components 2580) for the gripping members. The motor power circuits are monitored by current-sensing hardware (included within sensors 2560) that sends information reflecting the motor current back to the processor 2520. The processor 2520 translates that motor current information to into relative movement forces for the gripping members, and compares them against pre-programmed minimum and maximum values stored in storage 2540. In the event that normal values are exceeded or not achieved, the processor initiates the optimal reaction from a range of specific responses. The responses are designed to ensure safety and to prevent damage to the WMD and WMD securement device. Along with initiating the response, the processor 2520 stores the relevant error-code in storage 2540. The processor 2520 can summon a service inspection based on the type of error code, by duration of service in the field, by time spent in actual operation or by the number of operational cycles logged.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

In addition, for simplicity purposes, the terms arm, finger, joints, extremities, and other terms may be used herein, including in the claims, to refer to the various structures constituting the various embodiments of the wheeled mobility device securement system. To the extent that these terms connote a particular shape and configuration (e.g., that the structures resemble human appendages), the claims are not intended to be limited as such unless a specific shape or configuration is specifically called out in the claims.

The invention claimed is:

1. A securement system adapted for securing a wheeled mobility device during transport in a securement area having a seat moveable between a use position and a retracted position, the securement system comprising a processor programmed to: receive a first signal indicative of the presence of a wheeled mobility device; and, transmit a second signal in response to the first signal, the second signal causing the seat to move from the use position to the retracted position to clear the securement area for the wheeled mobility device.

2. The securement system of claim 1, wherein the processor is further programmed to trigger at least one of a visual, audible, and tactile alert for a seated passenger in response to the first signal.

* * * * *